US010944318B2

United States Patent
Young et al.

(10) Patent No.: US 10,944,318 B2
(45) Date of Patent: Mar. 9, 2021

(54) METHOD OF CONTROLLING A CURRENT SHAPING CIRCUIT IN A CONVERTER WITH POWER FACTOR CORRECTION

(71) Applicant: Icergi Limited, Dublin (IE)

(72) Inventors: George Young, Dublin (IE); Trong Tue Vu, Dublin (IE)

(73) Assignee: Icergi Limited, Dublin (IE)

( * ) Notice: Subject to any disclaimer, the term of this patent is extended or adjusted under 35 U.S.C. 154(b) by 0 days.

(21) Appl. No.: 16/097,762

(22) PCT Filed: May 5, 2017

(86) PCT No.: PCT/EP2017/060791
§ 371 (c)(1),
(2) Date: Oct. 30, 2018

(87) PCT Pub. No.: WO2017/194410
PCT Pub. Date: Nov. 16, 2017

(65) Prior Publication Data
US 2020/0099288 A1    Mar. 26, 2020

(30) Foreign Application Priority Data

May 7, 2016  (GB) ..................................... 1608003

(51) Int. Cl.
*H02M 1/12* (2006.01)
*H02M 1/42* (2007.01)
*H02M 3/156* (2006.01)

(52) U.S. Cl.
CPC .......... *H02M 1/4208* (2013.01); *H02M 1/12* (2013.01); *H02M 1/4225* (2013.01); *H02M 2003/1566* (2013.01)

(58) Field of Classification Search
CPC .... H02M 1/42; H02M 1/4208; H02M 1/4225; H02M 1/12; H02M 1/14; H02M 2003/1566
See application file for complete search history.

(56) References Cited

U.S. PATENT DOCUMENTS

| 8,861,230 | B2 | 10/2014 | Sigamani et al. | |
| 2008/0310201 | A1* | 12/2008 | Maksimovic | H02M 3/1584 363/85 |
| 2013/0077362 | A1* | 3/2013 | Kumar | H02M 1/4225 363/49 |
| 2017/0012541 | A1* | 1/2017 | Ye | H02M 1/4258 |

(Continued)

OTHER PUBLICATIONS

Prodic, A. et al., "Self-tuning digitally controlled low-harmonic rectifier having a fast dynamic response," in IEEE Transactions on Power Electronics, vol. 18, No. 1, pp. 420-428, Jan. 2003. (Year: 2003).*

(Continued)

*Primary Examiner* — Fred E Finch, III
(74) *Attorney, Agent, or Firm* — Charles A. Lemaire; Jonathan M. Rixen; Lemaire Patent Law Firm, P.L.L.C.

(57) ABSTRACT

The present application related to switching circuits as employed in power supplies and more particularly to a method of controlling same. More specifically, the present application relates to current shaping circuits for use in power supplies and provides a method for controlling them which provides for stable operating conditions and fast transient response.

17 Claims, 13 Drawing Sheets

(56) References Cited

U.S. PATENT DOCUMENTS

| | | | |
|---|---|---|---|
| 2017/0170745 A1* | 6/2017 | Wu | H02M 1/42 |
| 2018/0267480 A1* | 9/2018 | Mahajan | G06F 1/12 |

OTHER PUBLICATIONS

Rathi, M. et al., "Dual voltage controller based power factor correction circuit for faster dynamics and zero steady state error," IECON'03. 29th Annual Conference of the IEEE Industrial Electronics Society (IEEE Cat. No. 03CH37468), Roanoke, VA, USA, pp. 238-242, Nov. 2003. (Year: 2003).*

Mather, et al., "Quantization effects and limit cycling in digitally controlled single-phase PFC rectifiers", "Power Electronics Specialists Conference, 2008. PESC 2008. IEEE, IEEE, Piscataway, NJ, USA", Jun. 15, 2008, pp. 1297-1303.

Prodic, et al., "Digitally controlled low-harmonic rectifier having fast dynamic responses", "Electronics Conference and Exposition. Annual Applied Power Electronics Conference. IEEE, U.S.", Mar. 10-14, 2002, pp. 476-482, XP010582961, vol. Conf. 17.

Spiazzi, et al., "Methods to improve dynamic response of power factor preregulators: an overview", "EPE Association, B,", Sep. 19-21, 1995, pp. 3754-3756, vol. 3, No. 19.

Bibian, et al., "Digital control with improved performance for boost power factor correction circuits", "Applied Power Electronics Conference and Exposition, 2001. APEC 2001. 16th Annual IEEE", Feb. 2001, pp. 137-143, vol. 1.

Wall, et al., "Fast controller design for single-phase power factor correction systems", "IEEE Transactions on Industrial Electronics", Oct. 5, 1997, pp. 654-660, vol. 44, No. 5.

Weirich, et al., "Design Review: Power Stage Design for a 200W Off-Line Power Supply", "https://www.fairchildsemi.com/technical-articles/Design-Review-Power-Stage-Design-for-a-200W-Off-Line-Power-Supply.pdf", Jul. 10, 2015.

Das, et al., "A nonlinear controller based on a discrete energy function for an AC/DC boost PFC converter", "IEEE Transactions on Power Electronics", Jan. 9, 2013, pp. 5458-5476, vol. 28, No. 12.

Prodic, et al., "Dead-zone digital controllers for improved dynamic response of low harmonics rectifiers", "IEEE Transactions on Power Electronics", Feb. 2006, pp. 173-181, vol. 21, No. 1.

Teodorescu, et al., "Proportional-resonant controllers and filters for grid-connected voltage-source converters", "IEE Proc.—Electr. Power Appl.", Sep. 2006, pp. 750-762, vol. 153, No. 5.

UKIPO Search Examination Report for priority Application GB1608003. 8, dated Oct. 31, 2016, 7 pages.

* cited by examiner (a) Voltage and current waveforms in response to period loads (b) Detailed waveforms around a low-to-high load transition

METHOD OF CONTROLLING A CURRENT SHAPING CIRCUIT IN A CONVERTER WITH POWER FACTOR CORRECTION

CROSS-REFERENCE TO RELATED APPLICATIONS

This application is a national-phase filing of, and claims priority benefit of, PCT Patent Application No. PCT/EP2017/060791, filed May 5, 2017 by George Young et al. and titled "A method of controlling a current shaping circuit in a converter with power factor correction," which claims priority benefit of Great Britain Patent Application No. GB 1608003.8, filed May 7, 2016 by George Young et al. and titled "A method of controlling a current shaping circuit in a converter with power factor correction."

FIELD OF THE APPLICATION

The present application related to switching circuits as employed in power supplies and more particularly to a method of controlling same.

BACKGROUND

Power conversion systems are well known. Examples of power conversion systems include AC-DC converters, DC-DC converters and DC-AC inverters. Such converters and inverters typically employ one or more switching circuits to convert from an input supply to an output.

It is known for current shaping (active filter) circuitry to be provided in power conversion systems in order to improve the quality of current drawn from a supply. In the context of quality, this is reflective of how close to a purely resistive load a power conversion system appears.

One exemplary type of current shaping circuit is referred to as a Power Factor Correction (PFC) circuit. Power factor correction is used with mains supplied equipment to ensure that the supply current waveform is substantially sinusoidal and in phase with that of the supply voltage.

It will be appreciated that power factor correction is generally achieved by means of control of a switching circuit rather than the design of the switching circuit per se.

Thus in the exemplary PFC circuit of FIG. 1a, the switching circuit may be controlled to provide for PFC correction or not as required by changing the nature by which the circuit is controlled, as reflected in the waveforms of FIG. 1b.

In this exemplary PFC circuit, an AC line input is rectified using a rectifying circuit (diode bridge comprising diodes 102, 104, 106 and 108). An inductor 110 is switchably connected in parallel with the output of the rectifying circuit by a switch 112. A second switch 114 allows energy in the inductor to be discharged into a capacitor 116 which is positioned in parallel with the output from the switching circuit and where a load may be connected. This load might for example be a further switching converter (for example an isolated DC-to-DC converters) in turn providing a further output voltage to another load. Switch 114 might be a diode in the case of simpler implementations.

The capacitor 116 is typically a physically large part (relative to other components in the switching circuit) as general control arrangements require significant energy storage to ensure stability and other circuit criterion are met.

PFC functionality is typically mandated, by regulations in different countries throughout the world, in any AC-DC power converter with input power above a threshold, which is 75 W for most applications and countries with a lower threshold power level in the case of certain applications, for example lighting. It will be appreciated that these regulations are continuously subject to change and typically requirements become stricter over time.

Another exemplary use of current shaping circuitry is that as shunt correction circuitry. Shunt correction circuitry attempts to achieve a substantially DC current flow from a DC source feeding an inverter which generates AC power. The shunt correction circuitry acts as an active filter absorbing or injecting current ensuring that the line-frequency components from the output side are substantially removed from the current supplied from the source. This type of circuitry might for example be employed where the input voltage is from a renewable energy source (e.g. Wind Turbine or Solar Panel).

An exemplary shunt correction circuit is shown in the inverter arrangement of FIG. 2, in which the energy source is modelled as a DC voltage source 202 in series with a resistor 204.

The inverter part of the arrangement, essentially the right dashed section of FIG. 2, uses switches 214 and 216, to generate a PWM waveform which is filtered by inductor 218 and capacitors 220 and 222. A full unfolding bridge may be used, typically using thyristors, or a "half unfolding" arrangement as is shown with 224 and 226 being switches controlled at line frequency. The active filter comprises switches 206 and 208, with 210 being alternately a buck or boost inductor in the context of energy exchange with a reservoir capacitor 212.

It will be appreciated that the exemplary implementations shown in FIGS. 1 and 2 are simpler implementations and that more complex arrangements, as associated with the need for higher efficiency, may be used. These include "bridgeless" PFC stages and multilevel cascades of switching devices may be used in place of the two-switch structures shown in the case of the synchronous rectifier, inverter and active filter sections.

For PFC applications, the current is conventionally programmed to be approximately proportional to the line voltage and in phase with it, resulting in pulsating power appearing at the output which can be well approximated by $$P_{out}(t) \approx P_{in}(t) = V_{in}(t)I_{in}(t) = \frac{V_m^2}{2R_e}[1 - \cos(2\pi f_{line}t)] \quad (1)$$

where $V_m$ and $f_{line}$ denotes the amplitude and frequency the line voltage, respectively while $R_e$ is the emulated resistance controlling power transfer to the load.

A PFC circuit typically feeds one or several downstream stages driving loads with slow variations in voltage and current.

Hence, the PFC load may generally be modelled as a constant power sink which should equals $$\frac{V_m^2}{2R_e}$$

at steady state.

Thus the energy presented by the variable term of equation (1), $$\frac{V_m^2}{2R_e}[\cos(2\pi f_{line}t)]$$

has to be absorbed by bulk capacitor 116. This results in double-line-frequency ripples at the output voltage.

As downstream stages tend to be most efficient when operated with a narrow input voltage range, a challenge always is to provide quasi-constant capacitor voltage at steady state and limit overshoot and undershoot during transient responses. The conventional solution is to size the capacitor sufficiently large enough to absorb transients.

In the case of inverters, it will be appreciated that there is a power transfer profile generally opposite to that of a PFC circuit. In particular, the downstream stage—an inverter—demands DC power superimposed by AC components while the DC source is required to provide DC power only.

A traditional approach was to employ a capacitor to absorb power ripples. The capacitor, typically an electrolytic, is placed between the inverter and DC source.

Unfortunately, this is less than desirable due to relatively short capacitor lifespans and significant capacitance requirements in order to remove most/all of the ripples on the DC bus.

Therefore, the shunt active filter (described above) composing two active switches and a capacitor has been gradually introduced in recent years to replace the existing technology.

As the ripples-storage capacitor is now connected to the bus through a synchronous buck-boost converter, the capacitor voltage need not need be quasi-fixed and can be varied between any levels depending on the magnitude of the power ripple and offset voltage which may be controlled.

Allowing greater swings in capacitor voltage allows for use of smaller capacitances to be deployed without penalizing performance and as a result enabling the use of ceramic capacitors with a better lifespan.

Due to the quadratic relationship between the active filter input power and capacitor voltage, the voltage ripple is a distorted sinusoidal. The only downside of the active filter is the requirement for a more complex controller with one of the challenges being to ensure a quasi-steady state capacitor voltage with adequate swing allowing maximal absorption of ripple components at all operating conditions of the inverter stage.

There is an attraction in being able to reduce the size of the electrolytic capacitor, in order to minimise the cost and the physical volume of the PFC stage, which can account for 20% or more of the volume utilisation in many power designs. However, practical limitations on using smaller values of electrolytic capacitance come about due to control challenges.

A conventional control approach, as illustrated in FIG. 4 comprises an inner current loop compensator performing a current loop compensating function based on an emulated resistance value with an outer voltage control loop provided the emulated resistance value. The voltage control loop (or "outer loop") in an active filter circuit such as a power factor correction stage typically employs a modified "Proportional Integral"—or "PI"—approach, where the effect of the pole at zero frequency is reduced by placement of a low-frequency zero, with the goal here being to enhance stability with constant power loads.

The output of this control "outer loop" is an emulated resistance value $R_e$ and the average current is then programmed in an "inner loop" to follow $V_{in}/R_e$, where $V_{in}$ is the instantaneous value of the line input voltage. It will be appreciated that the emulated resistance value $R_e$ is not an actual resistor but rather is a value that indicates what the relationship should be between current (which is controlled by the inner current control loop) and the supply AC voltage.

The voltage control (outer) loop operates in a continuous manner, which implies that $R_e$ can be adjusted at any time during the line cycle.

If the voltage loop is overly fast, then gross distortion of the current waveform can result due to $R_e$ varying widely across the line cycle.

On the other hand, if the voltage loop is overly slow the current waveform may not be distorted but the transient response will be poor. This means that in the case of "load dump" conditions, the voltage on the capacitor will increase—as the converter will deliver the programmed amount of power for some time prior to the loop acting. This may involve activation of protection circuitry, and increased device stress. Likewise, in the event of sudden application of load, the loop may not respond suitably quickly, and the capacitor voltage will sag to a level where protective measures, such as for example increasing the programmed current level, need to be undertaken. This can also result in additional device stress and "inelegant" operation.

A number of approaches has been proposed to bypass the "tradeoff" associated with the speed of the voltage control loop in conventional control of PFC stages.

These approaches are referenced in some of the following documents:

[1] S. Wall and A. Jackson, "Fast controller design for single-phase power factor correction systems", IEEE Trans. Ind. Electron., Vol. 44, No. 5, October 1997, pp. 654-660

[2] A. Prodic, J. Chen, D. Maksimovic, and R. Erickson, "Self-tuning digitally controlled low-harmonic rectifier having fast dynamic response", IEEE Trans. Power Electron., Vol. 18, No. 1, January 2003, pp. 420-428

[3] A. Prodic, D. Maksimovic, and R. Erickson, "Dead-zone digital controllers for improved dynamics response of low harmonics rectifiers", IEEE Trans. Power Electron., Vol. 21, No. 1, January 2006, pp. 173-181

[4] S. Bibian, and H. Jin, "Digital control with improved performance for boost power factor correction circuits", in Proc. 16th IEEE Applied Power Electron. Conf., March 2001, pp. 137-143

[5] P. Zumel, A. De Castro, O. Garcia, T. Riesgo, and J. Uceda, "Concurrent and simple digital controller of an AC/DC converter with power factor correction," IEEE Trans. Power Electron., Vol. 18, No. 1, January 2003, pp. 334-343.

[6] P. Das, M. Pahlevaninezhad, J. Drobnik, G. Moschopoulos, and P. K. Jain, "A nonlinear controller based on a discrete energy function for an AC/DC boost PFC converter", IEEE Trans. Power Electron., 28(12):5458-5476, December 2013.

[7] M. Rathi, N. Bhiwapurkar, and N. Mohan, "Dual voltage controller based power factor correction circuit for faster dynamics and zero steady state error", in 29th Annu. IEEE Industrial Electron. Society Conf., volume 1, pages 238-242, November 2003.

[8] R. Teodorescu, F. Blaabjerg, M. Liserre and P. C. Loh, "Proportional-resonant controllers and filters for grid-connected voltage-source converters," in IEE Proceedings—Electric Power Applications, vol. 153, no. 5, pp. 750-762, September 2006.

[9] Erickson, R. W. and Maksimovic, D. Fundamental of power electronics, 2nd Edition, Kluwer Academic Publishers, 2001

[10] Wierich, M., "Design Review: Power Stage Design for a 200 W Off-Line Power Supply", Internet: https://www-.fairchildsemi.com/technical-articles/Design-Review-Power-Stage-Design-for-a-200W-Off-Line-Power-Supply.pdf, [Jul. 10, 2015].

In summary, these approaches have included:

Output voltage ripple elimination through discrete time sampling [1], effectively removing ripples but having limited performance due to slow digital PI controllers.

Usage of comb filters [2], intended to reduce line-frequency ripple from control approaches—but these are complex to implement and the autotuning required to address different line frequencies takes time.

Dead-zone approaches [3], essentially imposing guard band action if the voltage strays outside a dead-zone.

Fully digital implementation with simplified controller [4], penalizing control performance for hardware simplicity and computational speed.

Non-linear control approaches [6], deriving control laws from a state space model which is complex and demands significant computational resources.

Usage of dual analogue voltage controllers [7], basically using one fast controller for transient responses and a slow controller for steady state operation. The overall performance is technically improved but one has a greater challenge on achieving seamless transfer of control actions and stability.

Regrettably, many of these approaches [2, 3, 6] are computationally-intensive making them unsuitable for general application while others [1, 5, 7] are not fast enough to deal with reduced capacitance deployments in which any severe step load can cause dramatic overshoot or undershoot on the bus voltage, in turn, shortening lifespans of electronics components or causing device failures.

The present application is directed at providing an alternative method of controlling active filter circuits in power supplies such as power factor correction circuits for AC-DC converters and active shunt circuits for DC-AC inverters.

SUMMARY

The present application provides a reasonably simple yet effective control arrangement for current shaping circuits in power supplies providing or operating from an AC voltage. The control arrangement has an inner current control loop and at least one outer voltage control loop. A first voltage control loop provides an updated value to the inner current control loop on a cycle by cycle or half cycle by half cycle basis. In the event of a transient being detected, a voltage control loop (which may be the first or another) causes the value being used by the current control loop to be updated. The control arrangement is based on a power-balancing principle allowing for fast dynamic responses with stable operation and limited requirements for computational resources.

These and other aspects will become apparent from the detailed description and claims which follow.

DETAILED DESCRIPTION

The present application will now be explained in detail with reference to implementation in an active filter (current shaping) circuit of a power supply either converting an AC voltage to a DC voltage or vice versa.

Figure 4:
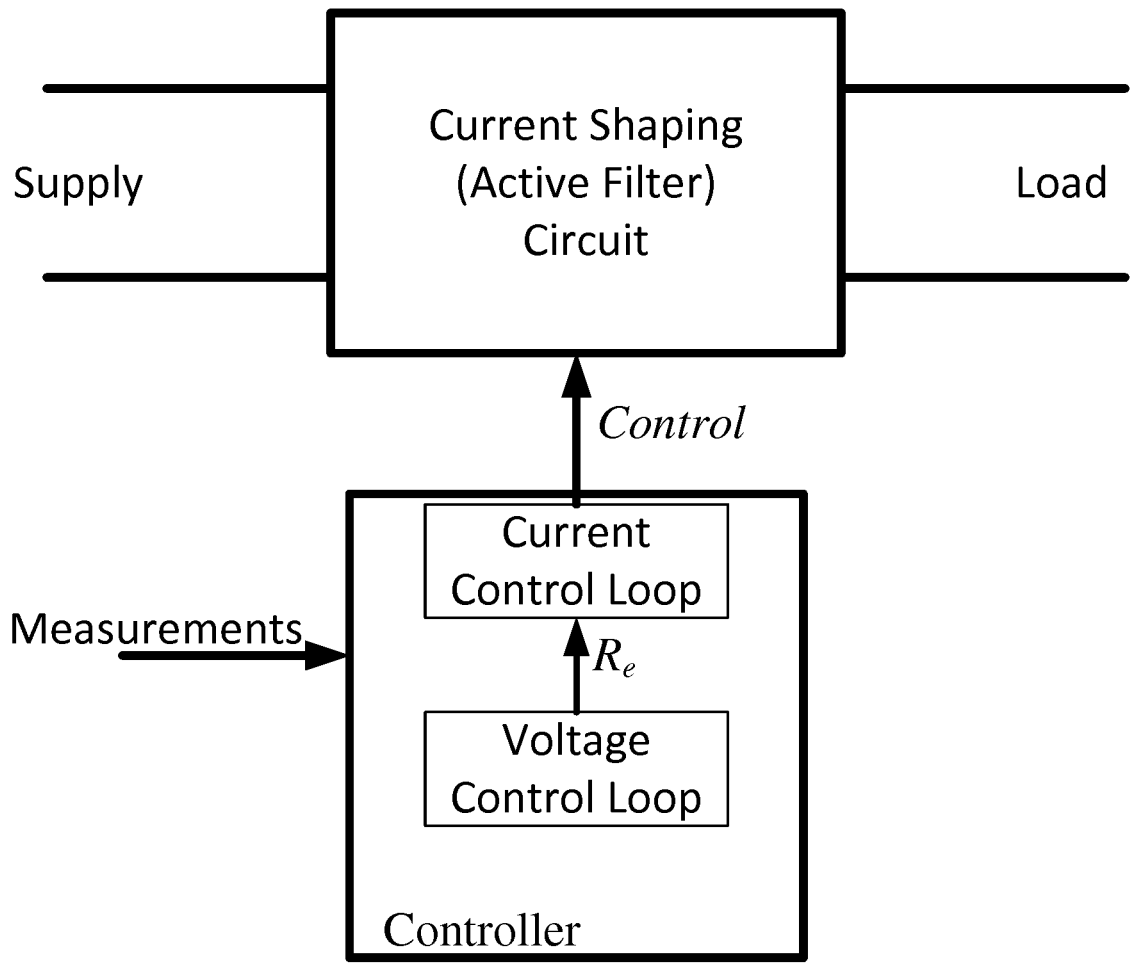
FIG. 4 illustrates a known arrangement for controlling a current shaping circuit of the type shown generally in FIG. 1 or 3.

The conventional prior art approach of FIG. 4 comprises two control loops which operates on the basis of measurements from the active filter circuit. An inner control loop is employed to provide a control (e.g. PWM) signal to control the current in the active filter circuit. In the case of a PFC circuit, this means to cause the current to follow the mains voltage. The inner control loop employs an emulated resistance value which is continuously updated by an outer control loop. To ensure stability, the response of the voltage control loop is significantly slower than that of the current control loop. As a result, a large capacitor is required to protect against transients.

Figure 5:
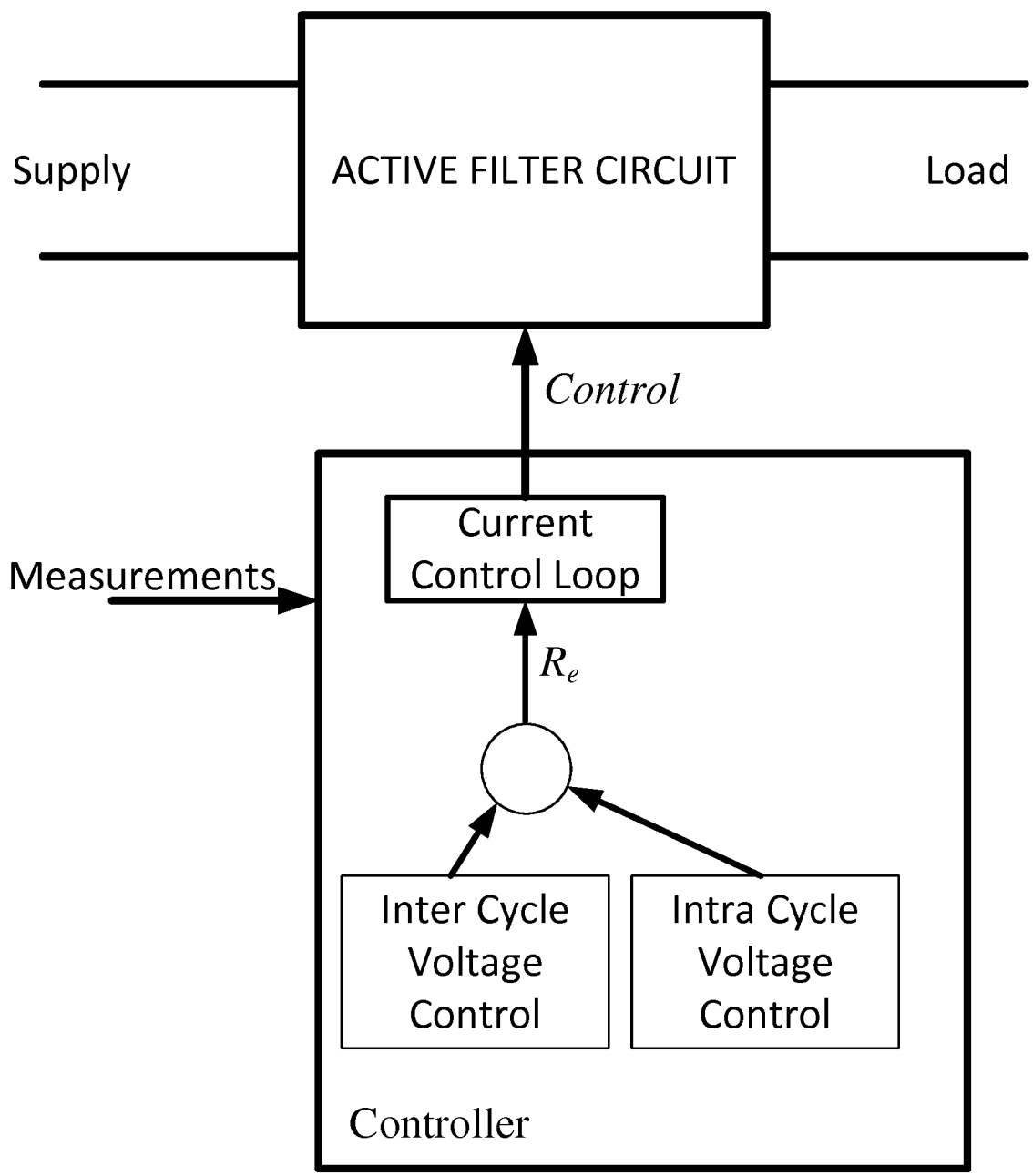
FIG. 5 illustrates an arrangement for controlling a current shaping circuit according to a first aspect of the present application.

The present application provides a solution which improves upon this performance. As with the prior art, and as shown in FIG. 5, the present application employs a first (inner) control loop to effect control of current in the active filter circuit (albeit potentially different as will be described in greater detail below) based on an emulated resistance control value.

At the same time, the present application employs a second control function to provide the emulated resistance control value. However, in contrast to the prior art, the emulated resistance control value is not provided to the inner control loop continuously. Instead the emulated resistance value is updated on a cycle or mid-cycle basis of the AC waveform. Accordingly, the resulting compensator is referred to herein as an inter-line cycle compensator and the control function is inter-line cycle compensation.

Figure 6:
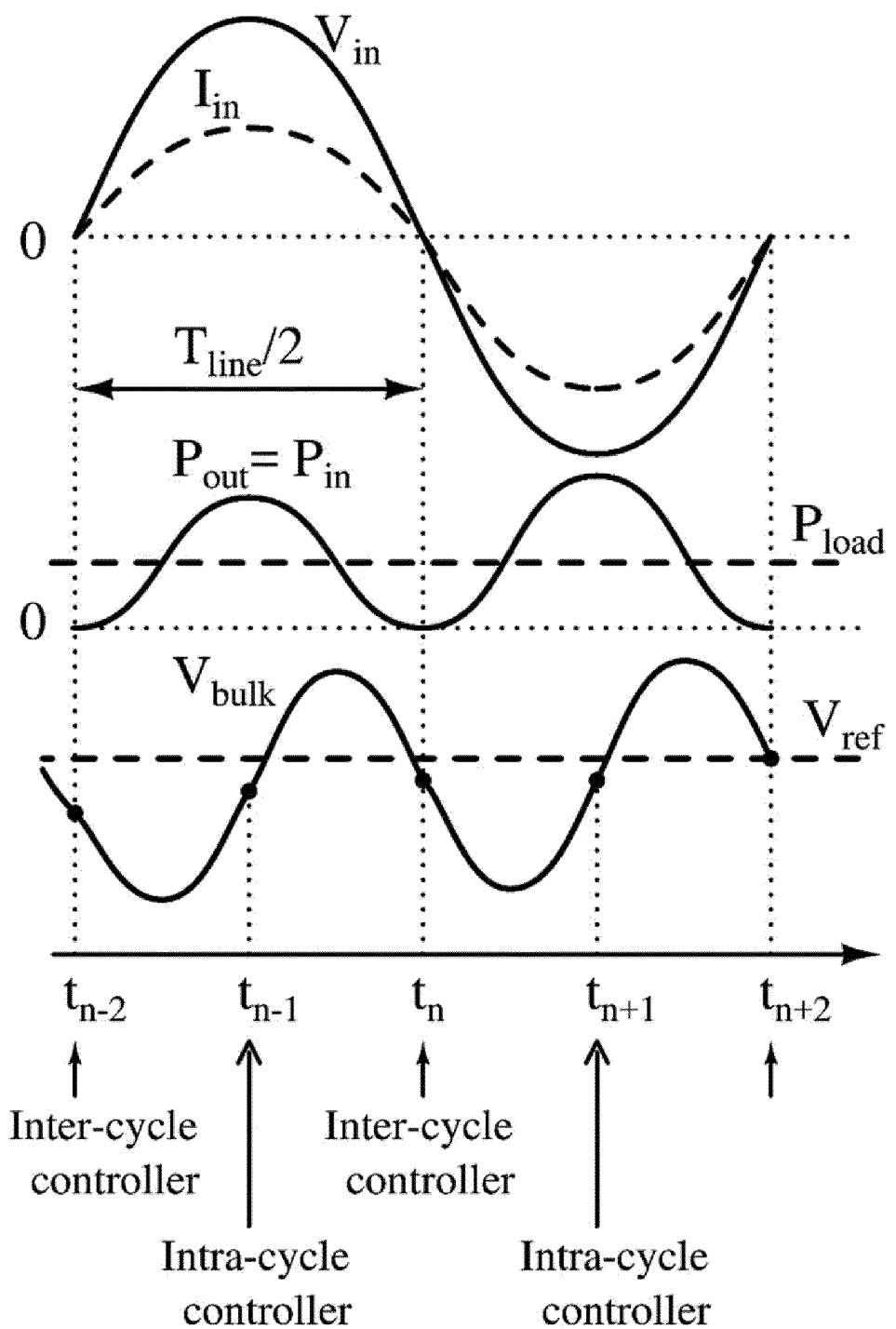
FIG. 6 illustrates operational waveforms of a PFC stage, where $V_{in}$—Input voltage, $I_{in}$—Input current, $P_{in}$—Input power, $P_{out}$—Output power, $P_{load}$—Load power, $V_{bulk}$—Output capacitor voltage and $V_{ref}$—Reference voltage.

Suitably, the emulated resistance value is updated at a point reflective of a zero crossing of the AC waveform as shown in FIG. 6.

The use of this inter-line-cycle compensation allows for stable operation of the controller. At the same time, it allows for the emulated resistance control value to be correctly determined based on conditions on a cycle or half-cycle basis. Additionally, it will be appreciated that by updating the value of emulated resistance at the zero crossing points, that the resulting current waveform for the following half cycle/cycle will accurately follow the AC voltage under steady state conditions.

A further control aspect, referred to herein as an intra-cycle compensator or intra-cycle compensation, is employed to improve the speed of response where a transient is detected, e.g. a sudden load or supply change. Under stable operating conditions, this intra-cycle compensator is not required. However, where a sudden supply or load change is detected, the intra-cycle compensator causes the emulated resistance value to be updated.

Suitably, the intra-cycle compensation is only performed at or close to a peak of the AC waveform.

Using a combination of the inter-cycle and intra-cycle compensation for the outer voltage control loop, a controller is provided capable of effecting fast response to load changes, consistent with maintaining capacitor voltage in the filter circuit within a narrow range and with obtaining near-sinusoidal current under steady-stage operating conditions.

The inter-line-cycle controller with slow dynamic responses takes care of steady state operation and small deviations from the set point while a fast intra-line-cycle corrector observes any abrupt change in the load current ensuring avoidance of significant overshoot or undershoot at the output voltage.

Additionally, the present application provides a control approach which is based on balancing the input and output power rather than the conventional approach of minimizing voltage errors. This provides improved performance as the filtering effect of the capacitor in the filter circuit is reduced and as a consequence allows for faster responses whilst ensuring globally stable operation.

Both controllers may be derived based on this idea of balancing the input and output power rather than the conventional approach of minimizing output voltage errors.

The application will now be described in greater detail with reference to an exemplary implementation with the active filter circuit being a PFC circuit and the controllers being implemented using a microcontroller.

It will be appreciated from the discussion in the background above that the approach may equally be applied to active filter (shunt) circuitry arising from the direct similarities between the control objectives of both the PFC and active filter (shunt) circuitry, i.e. the current entering the circuit needs to be programmed according to either power factor or ripple rejection requirements whilst at the same time, the capacitor voltage with ripples needs to be forced to maintain a correct level and be quasi-constant at steady state.

Thus an equivalent control structure and control methodology may be employed and for reasons of brevity the present application will be explained primarily in the context of a PFC controller.

Figure 7:
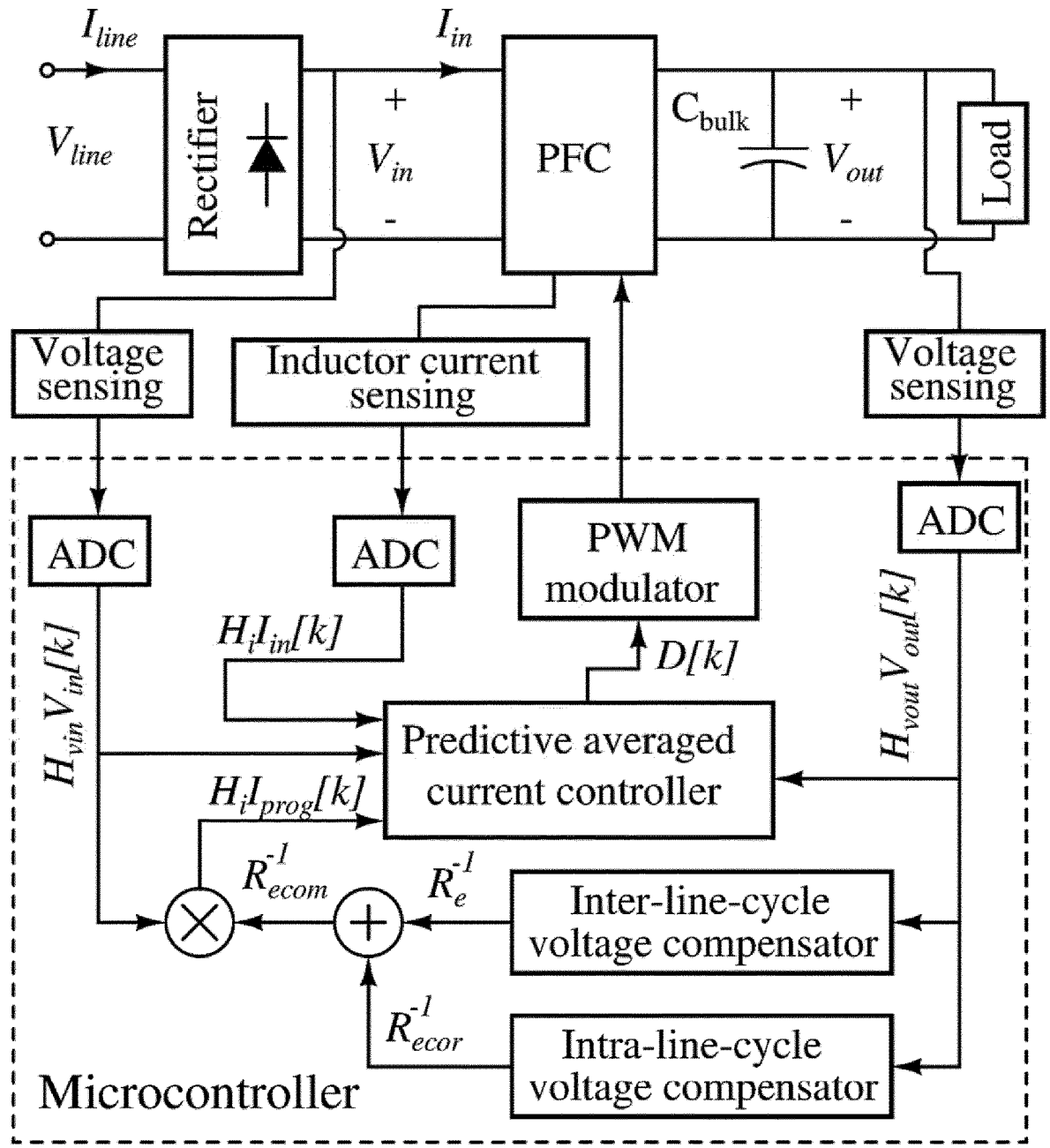
FIG. 7 provides a more detailed implementation but corresponding generally to FIG. 5 as might be employed for control of a PFC rectifier stage such as shown for example in FIG. 1.

The exemplary PFC controller, shown in FIG. 7, provides for improved bandwidth of PFC stages without significant effect on current waveforms.

Fundamentally, the converter is still controlled by two loops: an inner current loop and an outer loop that regulates the output voltage through emulated resistance adjustment.

The inner control loop may for example be implemented using a suitable current loop compensating function, for example using a digital predictive approach to input current programming. This may be for example be similar to that presented in [4], the entire contents of which are herein incorporated by reference. Alternatively, as will be familiar to those skilled in the art, the current loop may also be implemented by other methods including digital proportional-integral (PI) control [9], proportional-resonant control [8], etc.

As explained above, the outer loop may now be advanced by using a combination of two controllers. The first controller being an inter-cycle voltage compensator and the second controller being an intra-cycle voltage compensator.

The first (inter-cycle) controller determines a deviation at a first point in a half cycle from a reference. Suitably, this first point is proximate a zero crossing. It will be appreciated that proximate may be taken to mean at a point where the absolute value of the AC voltage is close to zero. This for example may be taken to mean at a point where the absolute value of the AC voltage is suitably less than 20V and more suitable less than 10V. The inter-cycle voltage compensator calculates an updated value of emulated resistance based on the additional power required to correct for the deviation over at least one half cycle. This updated value is then employed by the current control loop for the subsequent half cycle. Thus the first voltage compensator, operates in a manner that the emulated resistance $R_e$ is periodically updated every half line cycle by the inter-cycle controller at zero crossing points.

The second intra-cycle voltage compensator is employed to account for any transients that might arise during the subsequent half cycle. Suitably, the emulated resistance $R_e$ is only corrected/replaced by the intra-cycle controller whenever major disturbances (transients) in the operating conditions are detected within half line cycles. Suitably, this may be performed at the peak of a half cycle, i.e. at the peaks and troughs of the AC input voltage. Although updating may occur at any time in the line cycle, driven either by periodic polling or by the bulk capacitor voltage indicating a suitable deviation from the calculated trajectory as will be explained below. It will be appreciated that as the inter-cycle voltage compensator may be viewed as a slow controller relative to the intra-cycle voltage compensator which is intended to react to transients.

The intra cycle compensator may perform a determination of the value of emulated resistance $R_e$ in a similar manner to that employed by the inter cycle compensator as will be explained below.

However, in order to avoid bumpy transfers on control actions, the output of the intra-cycle controller, $R_{ecor}$, may instead be employed as a correction term for the emulated resistance $R_e$ penalising under/over voltage transients.

This arrangement also benefits in allowing memoryless behaviour from the fast controller and consistency in control objectives for both compensators.

This approach can employ a determination of $R_{ecor}$ which may simply equate to the averaged input and output power of the PFC such that the averaged capacitor voltage can be brought back to a desired level within a half/quarter line cycle.

A further advantage of the present approach is that information required for power conditioning maybe reduced to the bulk capacitor voltage measured at zero-crossing points, crests, and troughs of the input voltage waveform, all of which should be readily available where digital implementation of the current loop is of interest.

As shown in FIG. 7, feedback signals required for control purposes includes the input voltage, inductor current, and bulk capacitor voltage, which all may be sensed by conventional analogue circuitry.

Indeed, it will be appreciated that there is considerable flexibility in selecting the appropriate sensing technique depending on the target application and bill of material (BOM) costs.

For example, with reference to FIG. 1A, the inductor current may be obtained by placing a current sense transformer/amplifier in series with the inductor 110, or by sampling the current going through the bottom MOSFET 112 with an assistance of a current sense resistor. At the same time, in the case of voltage sensing, a resistive divider in combination may be employed, optionally with an amplifier if for example buffering is demanded for high signal integrity.

It will be appreciated that since the arrangement shown only requires three measurements to be captured, the proposed control scheme may be fully implemented in any suitable microcontroller. Suitably, this would be one facilitating an Analog-to-Digital Converter (ADCs) with at least three channels, two for voltage measurements, and one for inductor current measurements. Additionally, timer chains may be employed for PWM modulation.

More detailed design approaches for exemplary compensators for the current loop and/or voltage loops will now be discussed further.

The purpose of a current loop is to keep the input current $I_{in}$ proportional to the input voltage $V_{in}$, where the gain is controlled by the voltage loop through the emulated resistance $R_e$.

Accordingly, if, as an example, the power stage is selected to be a synchronous pole boost converter as outlined in FIG. 1A, the control goal may be considered to program the averaged inductor current $I_{Lavg}$ to follow the reference governed by $$I_{ref} = \frac{V_{in}}{R_{ecom}} \tag{2}$$

where $I_{ref}$ is the value of current which the control loop attempts to control to, $V_{in}$ is the supply voltage and $R_{ecom}$ is the combination of $R_e$ and $R_{ecor}$. It will be appreciated that this may be generalised simply to equate to an equivalent resistance value.

From this the evolution of the averaged inductor current over time may be calculated. More specifically, the well-known state-space averaging technique, as comprehensively presented in [9], the entire contents of which are herein incorporated by reference, may be applied to calculate the evolution of the averaged inductor current in inductor 110 over time $$L\frac{dI_{Lavg}}{dt} = -(1 - D_{bot})V_{out} + V_{in} \tag{3}$$

where $D_{bot}$ is the duty ratio of MOSFET 112 and L is the inductance of inductor 110.

The averaged current $I_{Lavg}$ may be taken to be periodically sampled every switching cycle, so the relation between samples in two consecutive cycles about a sampling instant n (i.e. first cycle from n−1 to n and second cycle from n to n+1) may be obtained by discretising Equation (3) to provide:

$$I_{Lavg}[n] - I_{Lavg}[n-1] = \frac{T_{pwm}}{L}(-(1 - D_{bot}[n-1])V_{out} + V_{in}) \tag{4}$$

$$I_{Lavg}[n+1] - I_{Lavg}[n] = \frac{T_{pwm}}{L}(-(1 - D_{bot}[n])V_{out} + V_{in}) \tag{5}$$

where $T_{pwm}$ is the period of the switching cycle.

From the predictive control perspective, for example that presented in reference [4], it is desirable to set the control signal to a switch in the current shaping circuit, i.e. setting the duty ratio $D_{bot}[n]$ for the switching cycle n such that the averaged inductor current will equal the reference level at $t=(n+1)T_{pwm}$, i.e. $I_{Lavg}[n+1]=I_{ref}$.

Accordingly, substituting the control target into Equation (5) and adding the corresponding sides of Equations (4) and (5) gives $$I_{ref} - I_{Lavg}[n-1] = \frac{T_{pwm}}{L}(-(2 - D_{bot}[n] - D_{bot}[n-1])V_{out} + 2V_{in}) \tag{6}$$

If the duty ratio is assumed to change gently between two successive cycles, which is reasonable, the sum of $D_{bot}[n]$ and $D_{bot}[n-1]$ may be approximated by $D_{bot}[n]+D_{bot}[n-1] \approx 2D_{bot}[n]$.

Substituting the resulting equation into Equation (5) and solving for $D_{bot}[n]$ gives $$D_{bot}[n] = 1 - \frac{V_{in}}{V_{out}} + \frac{L}{2V_{out}T_{pwm}}(I_{ref} - I_{Lavg}[n-1]). \tag{7}$$

It will be appreciated that this may be employed for inductor current programming.

Specifically, an optimal duty cycle for a cycle may be determined, inter alia, from the average inductor current for the previous cycle.

Nonetheless, due to the lack of an integrator, there exists a disparity between $I_{ref}$ and $I_{Lavg}$, which may cause distortions around the tail parts of the current waveform.

Depending on the applications, these distortions might be tolerated.

However, to overcome such an issue, an integral term may be introduced to Equation (7), which results in $$D_{bot}[n] = 1 - \frac{V_{in}}{V_{out}} + \frac{L}{2V_{out}T_{pwm}}\left(I_{ref} - I_{Lavg}[n-1] + k_I \sum_{n=1}^{\infty} I_{error}[n-1]\right) \quad (8)$$

where $I_{error}[n-1]=I_{ref}-I_{Lavg}[n-1]$ denotes the deviation from the current set-point and $k_I$ an integral gain.

It will be appreciated that a suitable value of integral gain may be determined using a variety different methods including simulation. However, an integral gain $k_I$ of the order of 0.04 has been shown to be effective.

It will be understood, that output voltage ripples are not desirable in the context of power factor correction as feeding them back will pollute the power demand controlled by $R_e$, and as a consequence cause distortion of the inductor current.

Accordingly, processing the feedback voltage before using it for control purposes is generally desirable.

The present application provides a novel approach to this and for digital implementation, the ripples may effectively be removed by sampling the output voltage at the time instants where the input power $P_{in}(t)$ is either zero or maximum.

The exemplary use of such a sampling scheme will be used herein obtain feedback signals for both the inter-line-cycle and intra-line-cycle controllers.

Particularly, the output voltage may be captured every quarter line cycle with sampling points highlighted by dots as illustrated in FIG. 6.

For inter-cycle control, only information at zero-crossing points, e.g. $t_{n-2}$, $t_n$, $t_{n+2}$, etc . . . , is used while all voltage samples may be made use of by the intra-cycle controller.

The present application also provides a novel form of control using power balancing to effect control rather than a direct voltage control loop as such.

Considering a situation where the averaged output voltage is assumed to deviate from the set-point $V_{ref}$ at time $t=t_n$, the present application employs power balancing to correct for the deviation.

More particularly, a control objective may be stated as requiring a value of $R_e$ such that the output voltage gets back to the reference level at $t=t_{n+2}$.

This control objective may be achieved if the power balance condition during the period $[t_n, t_{n+2}]$ as described by Equation (9) is satisfied $$P_{in\_avg}^{[t_n,t_{n+2}]} = P_{load}^{[t_n,t_{n+2}]} + P_{adj}^{[t_n,t_{n+2}]} \quad (9)$$

where $P_{in\_avg}^{[t_n,t_{n+2}]}$ and $P_{load}^{[t_n,t_{n+2}]}$ load denotes the averaged power entering the PFC stage and power sunk by the load during $[t_n, t_{2+2}]$, respectively, while $P_{adj}^{[t_n,t_{n+2}]}$ is the extra power required to charge the bulk capacitor voltage from $V_{out}[t_n]$ to $V_{ref}$ which may be expressed by:

$$P_{adj}^{[t_n,t_{n+2}]} = \frac{C_{bulk}}{T_{line}}(V_{ref}^2 - V_{out}^2[t_n]) \quad (10)$$

Where $T_{line}$ is the cycle time for the AC supply

As the load power may not be available at the time of calculation, an estimation may be employed which may be carried out by a variety of methods.

One interesting method is to rely on the past averaged input power and capacitor voltage as given by Equation (11)

$$P_{load}^{[t_n,t_{n+2}]} = P_{in\_avg}^{[t_{n-2},t_n]} + \frac{C_{bulk}}{T_{line}}(V_{out}^2[t_{n-2}] - V_{out}^2[t_n]) \quad (11)$$

Sine $R_e$ is only adjusted at zero-crossing points and kept fixed for the whole half line cycle, the averaged input power during the intervals $[t_{n-2},t_n]$ and $[t_n,t_{n+2}]$ may be approximated by:

$$P_{in\_avg}^{[t_{n-2},t_n]} = \frac{V_m^2}{2R_e[t_{n-2}]} \quad (12)$$

$$P_{in\_avg}^{[t_n,t_{n+2}]} = \frac{V_m^2}{2R_e[t_{n+2}]} \quad (13)$$

Substituting Equations (13), (12) and (11) into (9) and solving for $R_e^{-1}[t_n]$ gives $$R_e^{-1}[t_n] = R_e^{-1}[t_{n-2}] + \frac{2C_{bulk}}{T_{line}V_m^2}(V_{ref}^2 + V_{out}^2[t_{n-2}] - 2V_{out}^2[t_n]) \quad (14)$$

Using the accurate load inference as described by Equation (11), it is possible to set the emulated resistance and power transfer to effectively "match" the load.

In theory, the proposed control law as described by Equation (14) should be able to bring the PFC output to the set-point within a half line cycle if a step load is committed right after zero crossing points.

However, in practice, performance is affected by non-deterministic load transition, component tolerances, and measurement errors, which experimental results have shown pushes the transient responses up to two or three half-line cycles. It will be appreciated that this is still a lot faster than conventional controllers [6].

Other advantages of Equation (14) are simplicity benefiting digital implementation and inherent integral actions allowing zero steady state error.

As compared to the linearised algorithm developed by reference [5], Equation (14) provides an exact non-linear solution to the control problem which suitably does not rely on any small signal approximation during the development.

As a result, a controller using this, in theory, is globally stable.

Additionally, the averaged capacitor voltage instead of the peak value is controlled, and so any concerns regarding variations in mean $V_{out}$ are reduced or indeed eliminated.

The controller may act on the basis of discrete half-cycles as shown. This has the ability to keep the capacitor voltage ripple within narrow bounds, allowing the usage of smaller values of capacitance than would otherwise be indicated. This has the advantage of reducing the size of an overall power supply.

Similar to the derivation above for the inter-cycle controller, a function for the intra-cycle controller may be derived.

However, the updating interval may now be considered as reduced to a quarter cycle, which boosts the closed-loop bandwidth of at least twice as compared to that of Equation (14).

Given a desire to force the averaged output voltage to reach the reference level within a quarter line cycle, one can present the expression governing the emulated resistance as $$R_e^{-1}[t_{n-1}] = R_e^{-1}[t_{n-2}] + \frac{4C_{bulk}}{T_{line}V_m^2}(V_{ref}^2 + V_{out}^2[t_{n-2}] - 2V_{out}^2[t_{n-1}]) \quad (15)$$

By comparing Equations (14) and (15), it will be appreciated that there is an argument that there is no need to complicate the design with dual controllers for the voltage loop as the intra-line-cycle controller should inherently have all features of the inter-line-cycle one but possess a lot faster dynamic responses.

Nonetheless, experimental evidence has found that using the intra-cycle controller alone demonstrates that control performance can be quite sensitive to switching noises. Equally inductor current distortion can happen occasionally under certain operating conditions. It will be appreciated that measures could be taken to accommodate for these.

Nonetheless, one approach which has been successfully employed is to adapt Equation (15) to operate in combination with the inter-cycle controller.

Particularly, the second term on the right hand side of Equation (14), i.e.

$$\frac{2C_{bulk}}{T_{line}V_m^2}(V_{ref}^2 + V_{out}^2[t_{n-2}] - 2V_{out}^2[t_n]),$$

named $\Delta R_e^{-1}$, may be employed to detect any significant sag in the averaged capacitor voltage and correspondingly correct the emulated resistance. In one arrangement, the term $\Delta R_e^{-1}$ may be freshly computed at every peak/trough of the input voltage. The result may then be compared with a threshold to detect any abnormalities in the averaged capacitor voltage due to step loads or variations in operating conditions. If an update is required, the emulated resistance will be recalculated according to Equation (15). Otherwise, the emulated resistance may be kept unchanged. It will be appreciated that using this approach, the current accurately follows the AC voltage and there is minimal distortion that might otherwise arise if the value of emulated resistance was constantly updated. At the same time, the arrangement is such that transients may be responded to relatively quickly where they arise.

It will be appreciated that for the purposes of determining whether the term $\Delta R_e^{-1}$ has exceeded a threshold, that it may not be necessary to perform an precise calculation of the value of $\Delta R_e^{-1}$ and a simplified form may be used for the purposes of detecting a transient condition.

Equally, it will be appreciated that the comparison of the value $\Delta R_e^{-1}$ with a threshold and the resultant update when a transient is detected is not necessarily restricted to being performed at the peaks and troughs. Indeed the check may be performed continuously. However, computational resources may be saved by performing it at a rate that is less that the rate at which the current loop is updated which it will be appreciated is effectively that of the switching frequency. Typically, the rate at which the comparison of the value $\Delta R_e^{-1}$ with a threshold will be performed will be closer to the AC frequency (e.g. 50 Hz) than the switching frequency, which may for example be greater than 20 kHz. In this context, the updating frequency may be considered as a multiple of the AC frequency, wherein the multiple is less than 100. For calculation purposes, it make be kept to less than 8. It will be understood that multiple need not be an integer. Nonetheless, there is an advantage to have the multiple as an integer multiple of 2 for symmetry.

Suitably, to avoid racing conditions, the threshold for $\Delta R_e^{-1}$ may be set to a relatively high value and the two controllers may be activated at respective different operating points as reflected in FIG. 6.

This approach has advantages of allowing computation of the power requirement ab initio for the line half-cycle and a value of the emulated resistance may be used that remains constant for this following line half-cycle.

This approach avoids the significant current distortion that would be associated with conventional PI control approaches capable of operating with fast response and using modest capacitor values.

When a material change in load characteristics is detected, then the emulated resistance value may be changed very quickly by the intra-line-cycle controller (i.e. within a quarter line cycle) so as to maintain the capacitor voltage within the preferred range associated with optimal operation of the system.

Experimental evidence has demonstrated that the transient responses last at most two line cycles so there should be no material effect on the current waveforms at steady state.

The control approach may be employed in any operating conditions including start-up and hold-up recovery. This is complete contrast to prior art approaches which typically requires opened-loop exercises.

The present approach seeks to operate with constraints on the emulated resistance.

Figure 8:
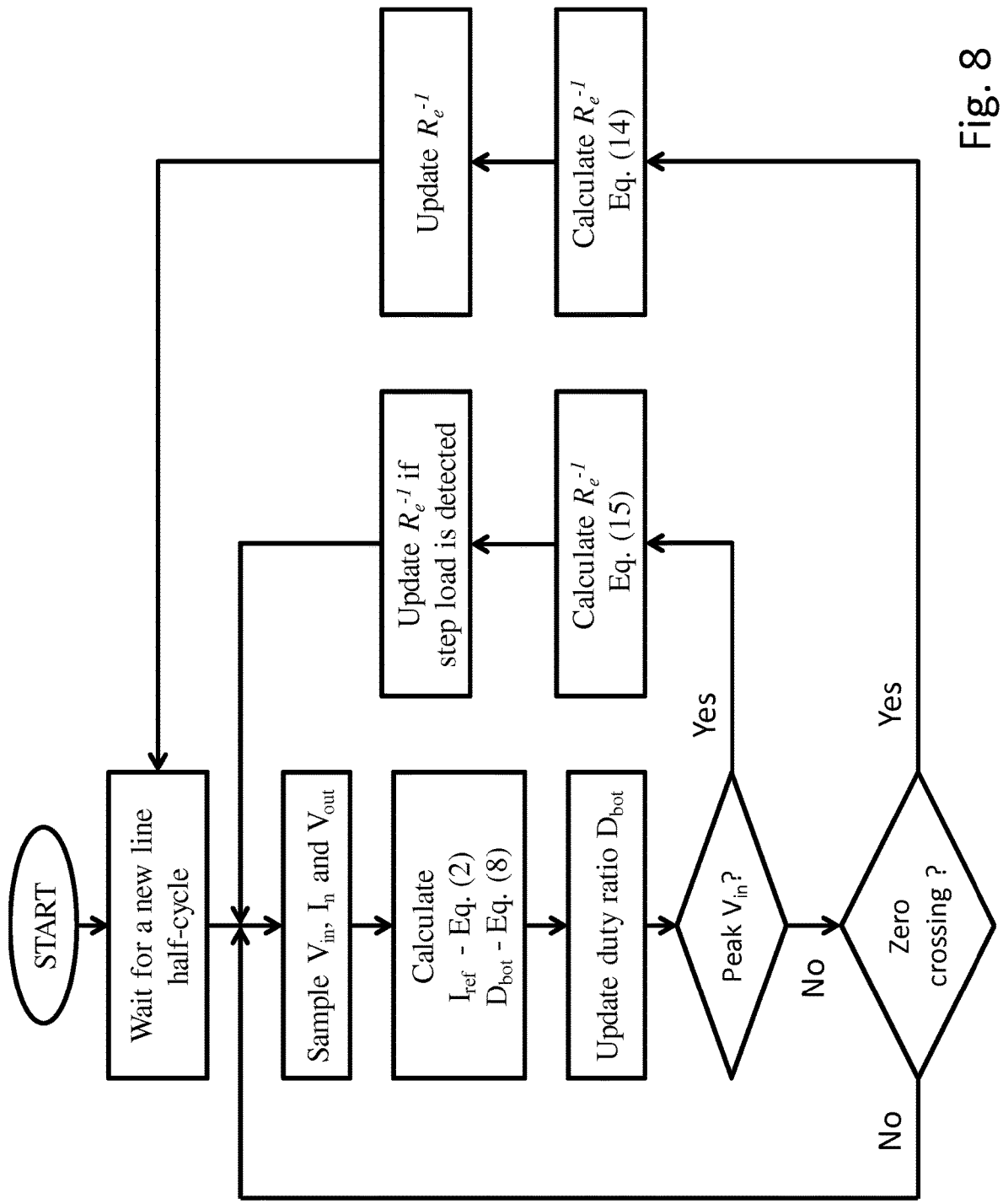
FIG. 8 is an exemplary flowchart representing a method as might be implemented by the arrangement of FIG. 5 or 7.

An exemplary method of implementation of the control approach suitable for most digital environments will now be explained with reference to FIG. 8.

The method may be viewed as comprising three main functions which may be summarized as follows:

Predictive current controller: Capture the input voltage, input current and output voltage required for calculations of the reference current and duty ratio according to Equations (2) and (8), respectively and then update the PWM modulation with the new value of the duty ratio $D_{bot}$. This routine is called every switching cycle $T_{pwm}$.

Intra-cycle voltage controller: once the input voltage reaches its peaks or troughs, the power increment in the bulk capacitor is computed to detect if any step load effects at the PFC output and the emulated resistance will be updated if necessary. This routine is called once a line half-cycle Inter-cycle voltage controller: when the input voltage is below the threshold for zero crossing, the emulated resistance is calculated and updated according to Equation (14). When the input voltage is below the threshold for zero crossing, the predictive current controller and intra-cycle voltage controllers may be halted.

The present application also provides for surge detection. This surge detection may be used with the controller described above or with other circuits employing a microcontroller or similar device for operating switching devices.

As will be familiar with those skilled in the art, a PFC may be required to be protected against surge events. It is not unusual to provide protection for about 2 kV-4 kV on top of the line voltage.

At the same time, it may be a requirement to restore normal operation without any functional failure or hiccup after such occurrences.

A conventional first step to surge protection is to place varistors (or other surge protection devices/circuits) across the line terminals. Varistors should generally clamp the input voltage down to a value in and around 700V. It will be appreciated that this is still nonetheless materially greater than the nominal output voltage.

Figure 1:
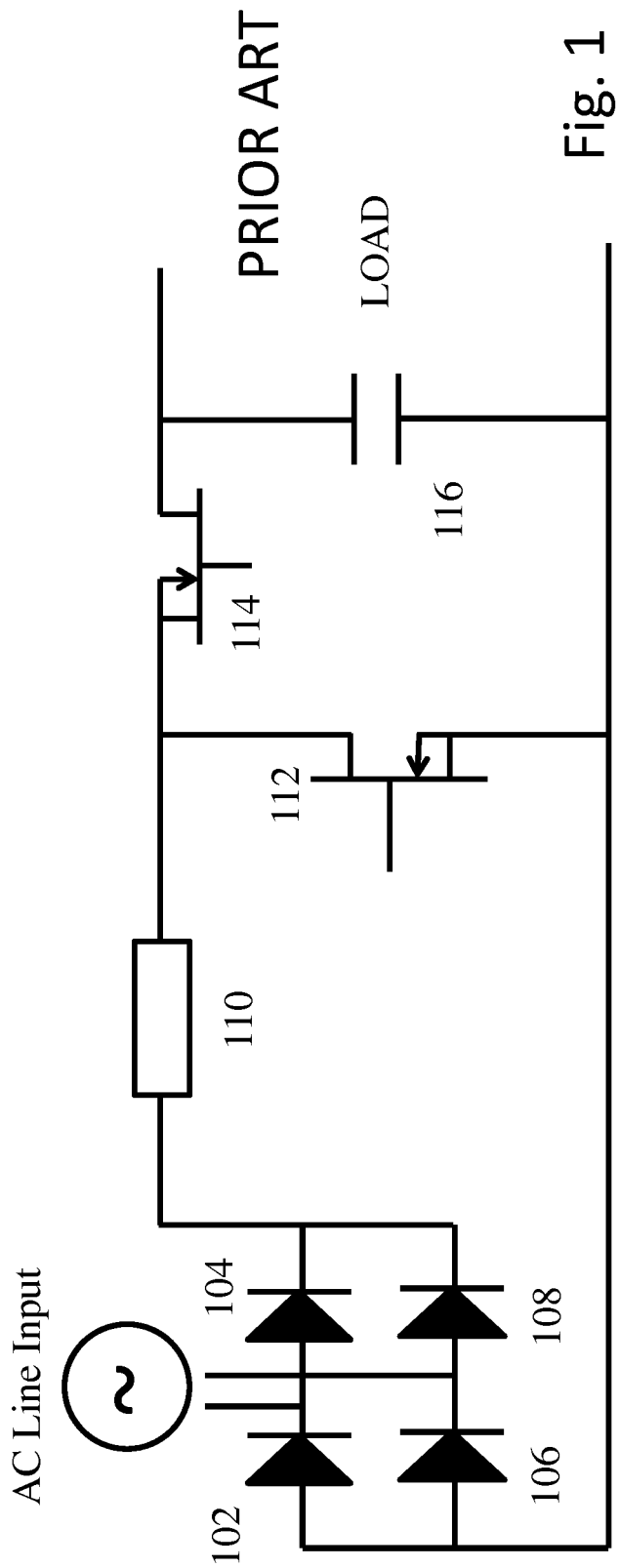
FIG. 1 is an exemplary current shaping circuit known in the art, specifically a Power Factor Correction ("PFC") circuit for use in an AC-DC converter.
Figure 2:
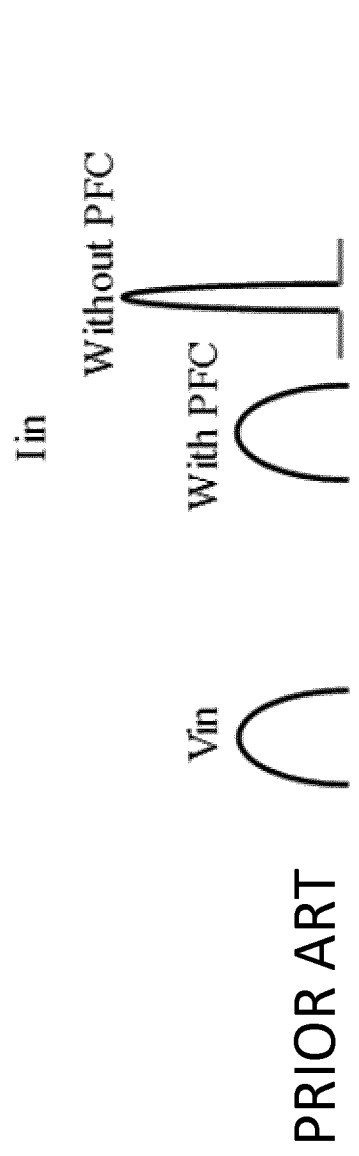
FIG. 2 illustrates an input AC voltage (left) and associated current waveforms when PFC is used (centre) and without PFC (right)
Figure 3:
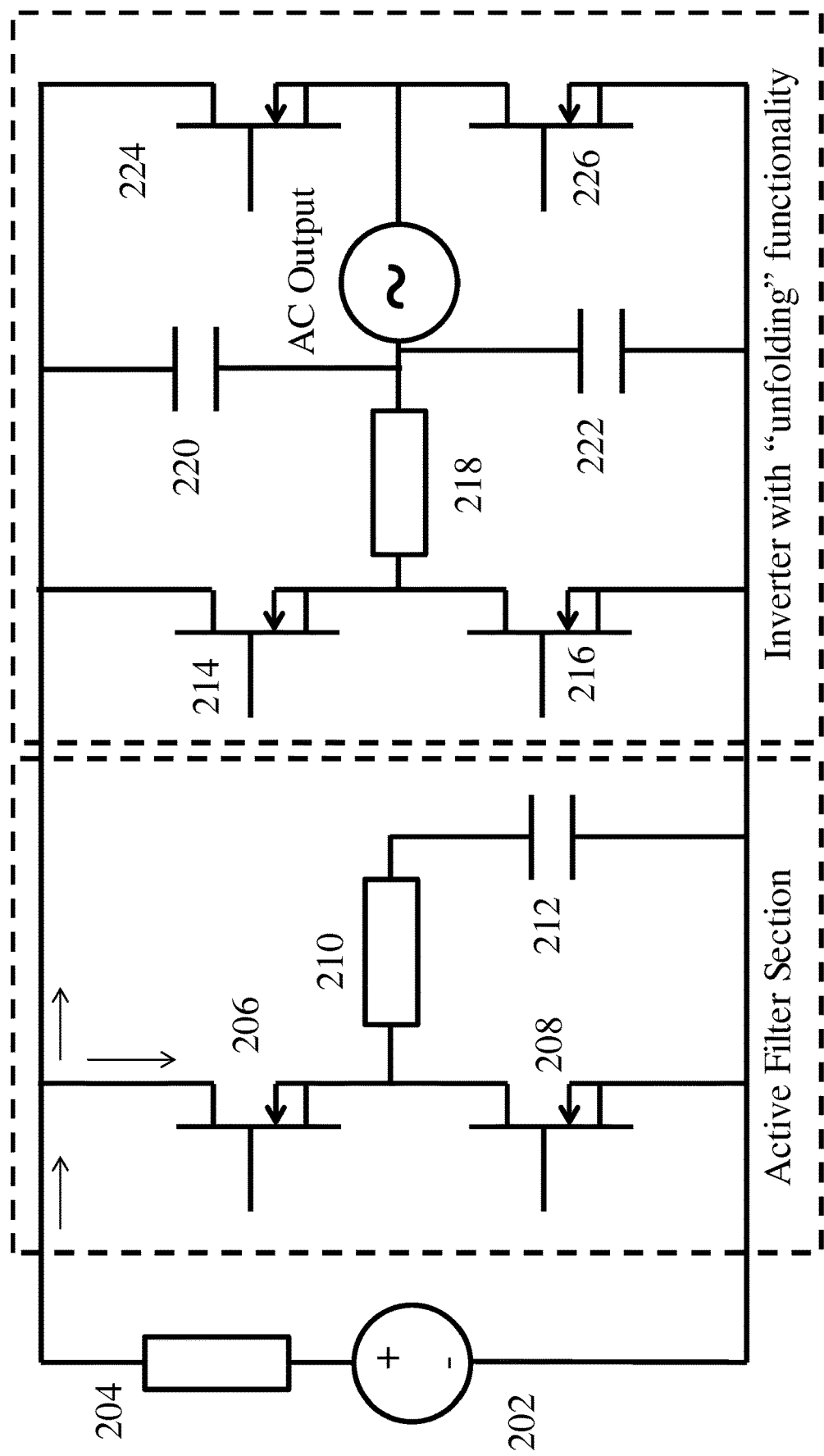
FIG. 3 shows a further current shaping circuit, namely a shunt active filter (left dashed section) as might be employed in parallel with an inverter (right dashed section), and fed from a DC supply.

This disparity between the input and output voltages can induce significant inrush current bypassing the boost stage, of the circuit of FIG. 1, and charging the bulk capacitor, imposing both overvoltage and overcurrent stresses on switching devices, which will in most cases result in operational failures.

Therefore, it is desirable to turn off the MOSFETs 112 and 114 as early as possible under surge conditions.

A conventional solution is to detect signs of surges by looking for excess current flowing in the inductor and/or excess capacitor voltage, and correspondingly triggering the controller to switch off the power stage.

Since the controller is only alerted when the converter is undergoing vulnerable operating conditions, any further delay until the gate drive signals are killed is not desirable. Therefore, the latency from surge detection to turn-off action is desired to be under 100 ns which may be possible for an analogue implementation but is challenging for a digital one.

One recognition is that excess current in the inductor is due to excess voltage at the input side in the first place, so any input voltage deviation from a nominal value can be used as an early detection for surge events. Likewise, an overvoltage fault can also be determined early by excess input voltage.

Using this recognition, a fast and effective approach to surge protection is proposed. This approach may be employed with the control scheme proposed above or with other control schemes.

In particular, a collar is effectively imposed on the input voltage. This collar provides a band within which any variation of input voltage is considered as benign and manageable, and this approach is seen as more robust and precise than one using a simple dV/dt detector.

Figure 9:
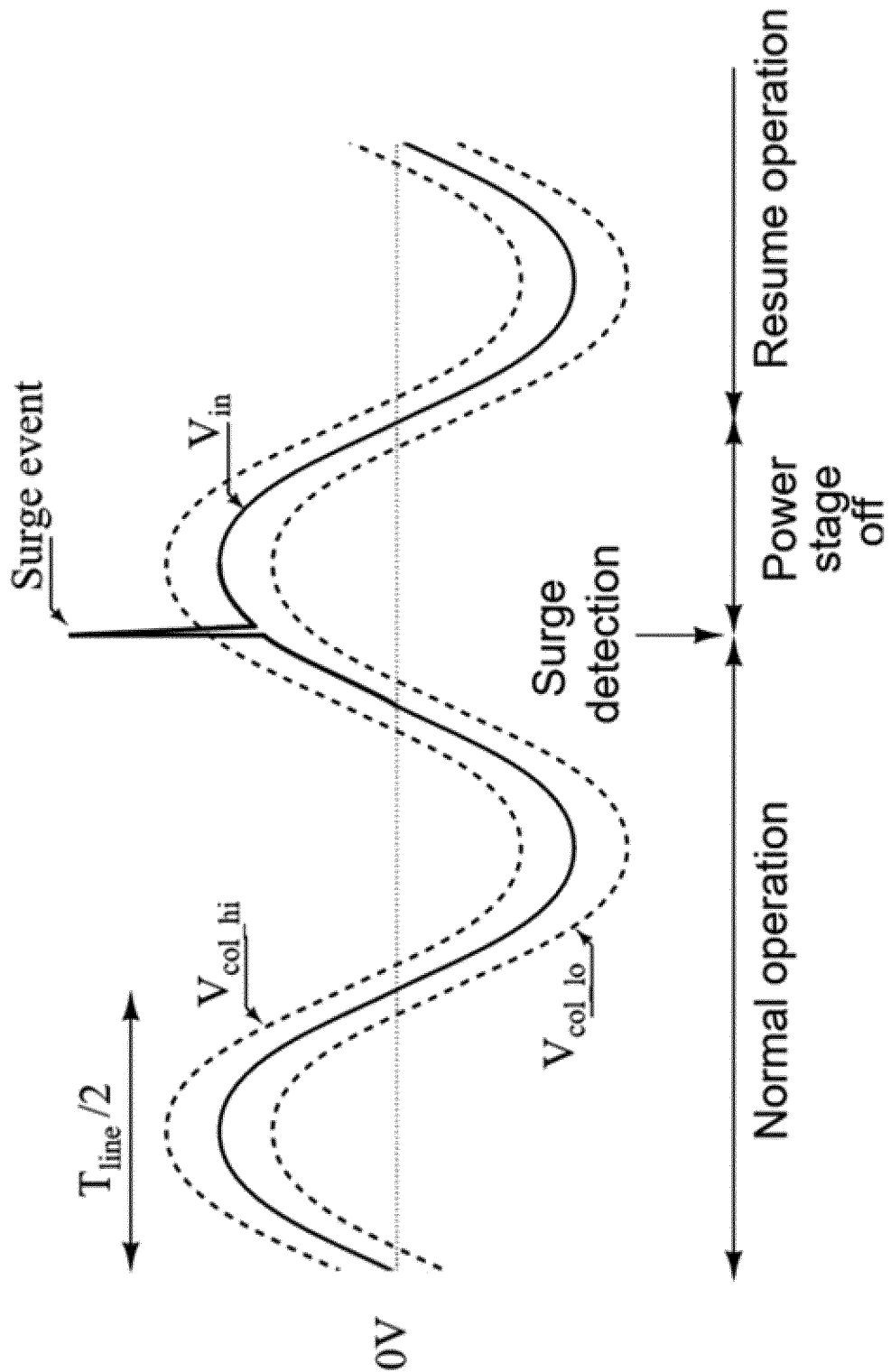
FIG. 9 illustrates a method of surge detection for use with a PFC stage, in which Surge voltage protection is based on out-of-band input voltage detection, with the collar (shaded area) formed by the upper limit $V_{col\_hi}$ and lower limit $V_{col\_lo}$ (Both have a similar waveform as the input voltage but are offset to allow even coverage of the input voltage)

The collar may be defined by two signals. The first $V_{col\_hi}$ is a signal generated by the controller. The generated signal is intended to be reflective of the anticipated AC voltage at any point in the cycle with a margin built in. The second signal may simply be the first signal with a reference deducted corresponding to twice the margin of the first. This is illustrated in FIG. 9.

Figure 10:
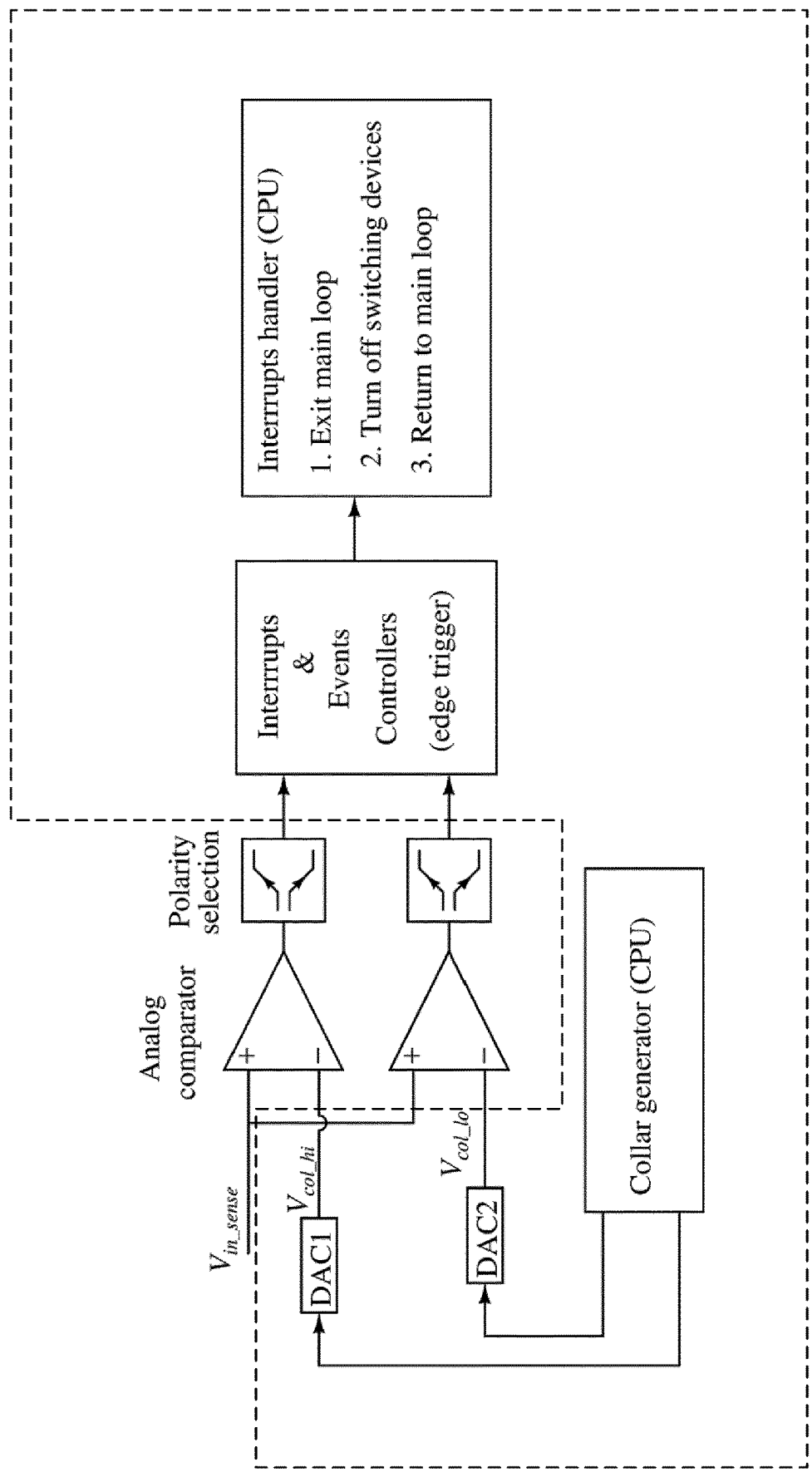
FIG. 10 is an exemplary circuit for implementing the method of FIG. 9.

An exemplary circuit for implementing a surge detector using such a collar is shown in FIG. 10.

The surge detector which may be employed with a microcontroller as previously described may be part implemented within the microcontroller and part implemented in analog circuitry outside the microcontroller. The advantage of such an approach is that the speed of response is much faster than might be achieved if the surge detector was implemented solely within the microcontroller.

More specifically, if the circuit was implemented solely within the microcontroller, then the detection process would be part of a larger routine. Accordingly, were a surge to occur, the response would be delayed depending on where in the routine the surge occurred.

If the input voltage goes outside this collar, an interrupt signal will be sent to the controller, which, in turn, kills the drive signals.

The collar can possess various shapes depending on how the upper threshold $V_{col\_hi}$ and lower threshold $V_{col\_lo}$ are generated.

Figure 11:
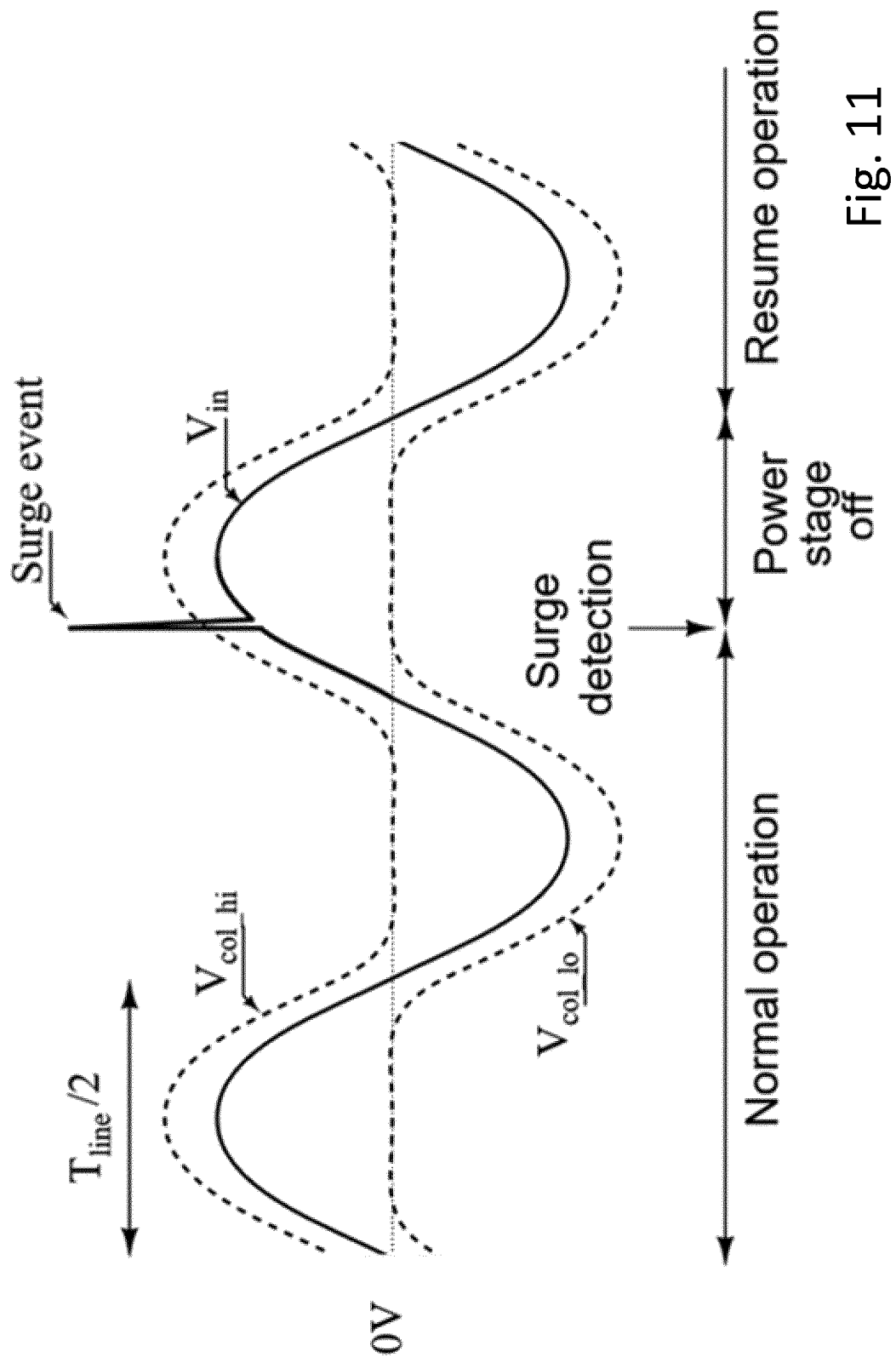
FIG. 11 represents an alternative shape of collar that may be employed for example in the circuit of FIG. 10, the alternative shape of collar is an asymmetrical collar design with either of the boundary being constant during each line half cycle.
Figure 12:
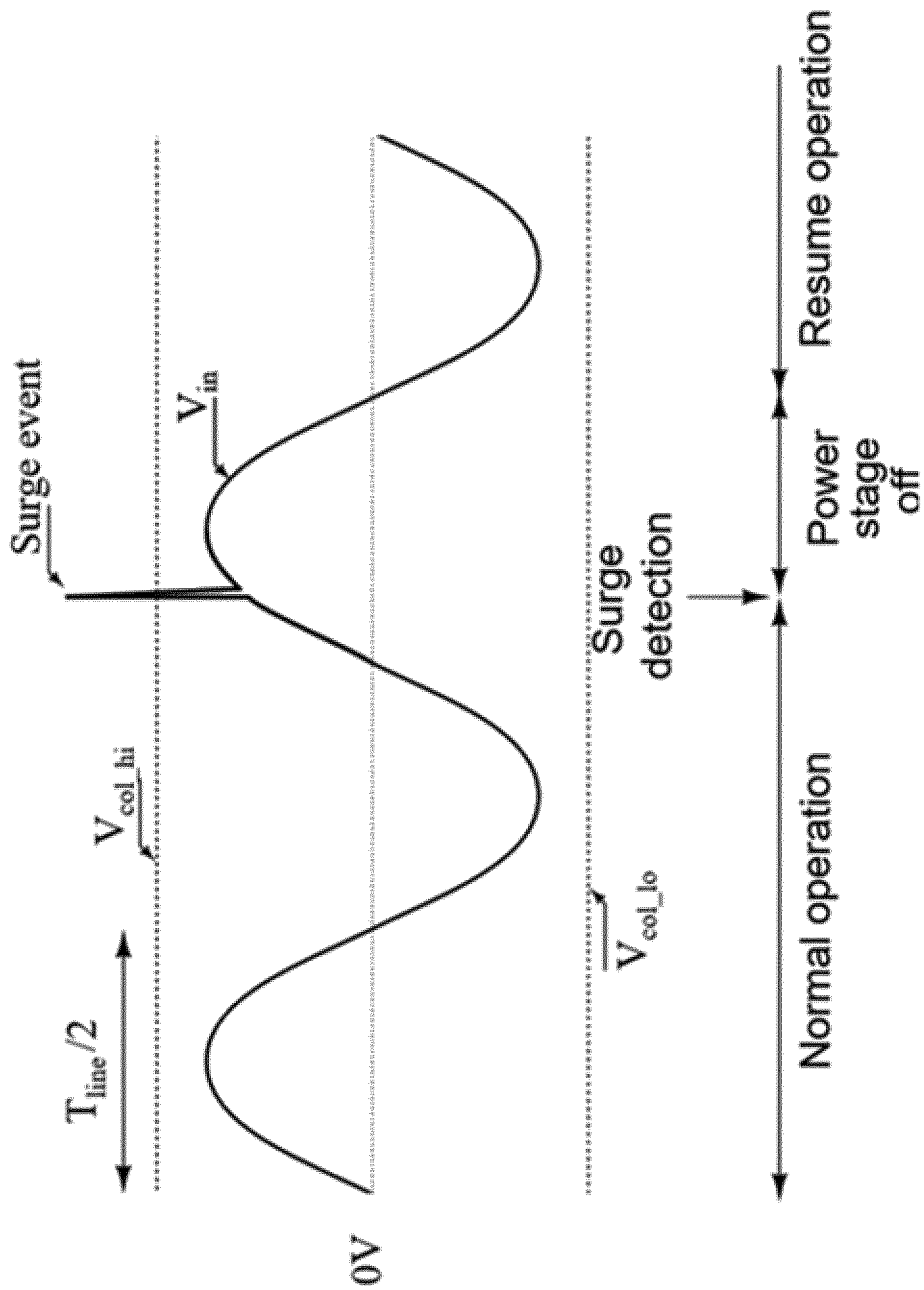
FIG. 12 represents a further alternative shape of collar with constant boundaries.

FIG. 9 illustrates one typical application with a collar having a similar shape as the input voltage, and two boundaries $V_{col\_hi}$ and $V_{col\_lo}$ evenly spaced away from it while FIGS. 11 and 12 exemplifies two other possible designs for the voltage collar.

It will be appreciated that surge detection latency is affected by the collar shape. A narrower collar should yield a faster response but is also more sensitive to line voltage disturbances.

In this context, the collar shape illustrated in FIG. 9 provided it has an adequate band gap can be considered as an optimal shape. Although, equally it will be appreciated further collar shapes are possible and one can easily derive other possible solutions by using different curve sets for the boundaries. Equally, if there is noise or other disturbances, which arise at certain points in the AC cycle, the collar shape may be adapted to account for these.

For digital implementation, the input voltage is firstly sensed by a differential amplifier feeding non-inverting inputs of two analogue comparators while the other comparator inputs are fed by two digital-to-analogue converters (DACs) with outputs controlled by the collar generation routine as shown in FIG. 9.

The polarities of the two comparators are configured to output low during normal operation and high when the input voltage goes outside the band determined by the DAC outputs. Any low-to-high transition will be immediately detected by the interrupts and events controller which then asks the central processing unit (CPU) to temporarily stop its current activities, serves the interrupt service routine— which is mainly to kill the drive signals of the PFC MOSFETs, and then gets back to its operation.

Both the collar generation and interrupt service routines are implemented by the CPU of microcontrollers. For certain deployments where the collar boundaries are constant, DACs can be replaced with fixed voltage references.

This is particularly useful in the context where microcontrollers support only one DAC or even don't have any DAC. In the circumstance of limited peripheral resources, i.e. absence of analogue comparators and DACs, the instantaneous rate of input voltage change ($dV_{in}/dt$) can be used as an alternative measure for surge detection with the microcontroller above.

The present application also provides a solution to problems associated with duty ratio saturation, which may be readily implemented in a microcontroller controlling a PFC circuit as described above.

As will be familiar with those skilled in the art, for a PFC circuit employed in mains supply, it is a general requirement that they operate at relatively high voltages, e.g. greater than 270 Vrms (vs normal 220V) for a short period of time.

However at these voltages, control of the inductor current may be lost due to duty ratio saturation.

More specifically, any fixed switching frequency PFC will have a limited dynamic range for a given duty ratio, e.g. from 0.05 to 0.95. This in turn suggests an operating range of 20V-380V given the nominal bulk capacitor voltage of 400V.

In such a situation, it will be appreciated that for any input voltage levels above 380V, the PFC can no longer program the inductor current. Instead, the PFC operates with a clamped duty ratio, which keeps boosting the output voltage above 400V as the input voltage keeps progressing.

Figure 13:
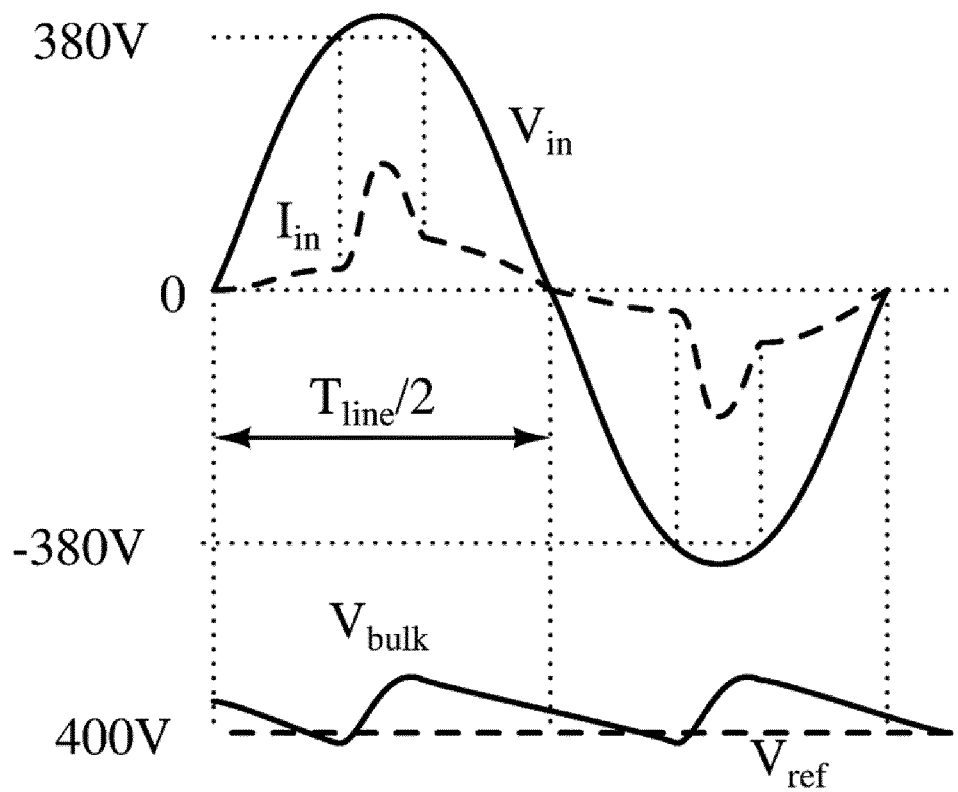
FIG. 13 illustrates a problem that arises where reduced bulk capacitance is employed in a PFC circuit, and shows operating waveforms of the PFC at voltage levels above 270 Vrms with the high current segments around the voltage peak/trough being due to duty ratio saturation.

This will ramp the inductor current quickly and only stop when the input voltage reaches its peak and starts rolling off as reflected in FIG. 13.

In addition to the concerns on the unregulated inductor current, the output voltage ripples are significantly higher compared to the same loading condition with a lower input voltage. It will be appreciated that this is not desirable for a downstream stage having a narrow dynamic range. Equally, it will be understood that where the value of the bulk capacitor is effectively reduced, the problem will be exacerbated, since the ability of the bulk capacitor to absorb such conditions is reduced.

The present application provides an effective solution for problems associated with uncontrolled inductor current. The solution is to temporarily stop the PFC when the input voltage rises above a predetermined level, e.g. above 380V.

Normal operation may be resumed the operation when the voltage has fallen back below the predetermined level, i.e. the voltage gets back to the regulable band.

Figure 14:
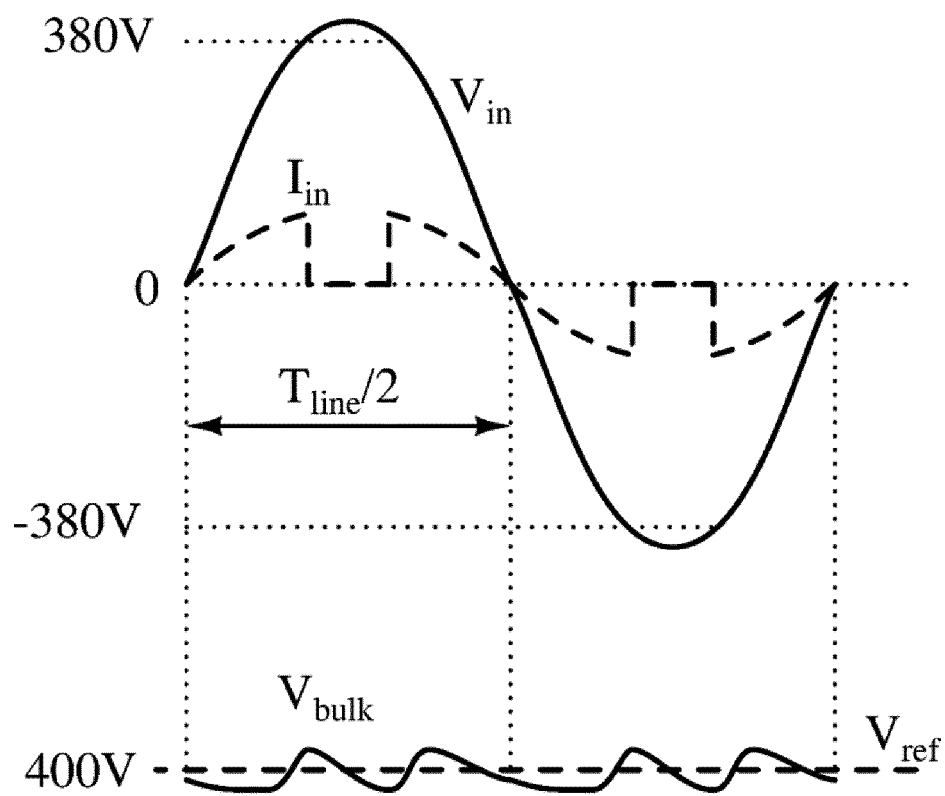
FIG. 14 illustrates a method of switching cycle skipping where operation of the PFC stage is disabled selectively during a half mains cycle when the input voltage exceeds a predetermined level, shown as 380V.

The approach is illustrated in FIG. 14, where it is clear that the PFC circuit has been disabled when the input voltage reached the predetermined level (e.g. a threshold voltage of 380V). The predetermined level is that voltage above which it is expected that control of the inductor current would be lost.

A hysteresis band may be provided about the predetermined level, as would be familiar to those skilled in the art. The use of be introduced to the threshold voltage to avoid unnecessary mode hopping. Due to the suppression of the inductor current around voltage peaks/troughs, the power factor will be relatively low; however, this doesn't raise any concern as the PFC is expected to stay in this condition for very short amount of time.

To demonstrated the effectiveness of the control approaches described above, a 200 W boost rectifier (PFC circuit) was built to verify the performance of the controller.

The rectifier was designed with the following specifications: universal line input voltage $V_{in}$–85-265 Vrms, nominal output voltage $V_{out}$=400V.

The controller was fully implemented in digital environment using low-cost, fixed-point, 48 MHz ARM Cortex M0 STM32F051 microcontrollers.

Figure 15:
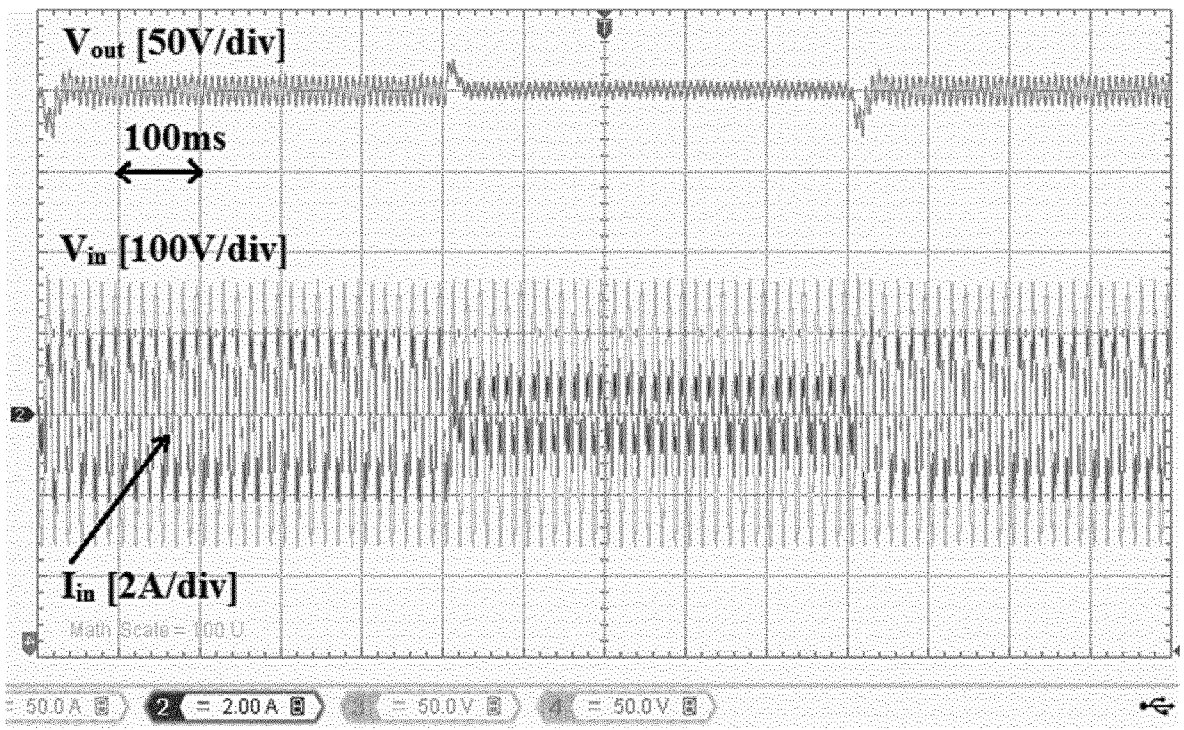
FIG. 15 illustrate experimental results for an exemplary PFC stage constructed, and more particularly dynamic responses using the controller described herein with such a PFC stage under 60 W-160 W periodic load testing conditions: CH2—Input current $I_{in}$, CH4—Output voltage $V_{out}$, Math channel—Input voltage $V_{in}$.
Figure 15:
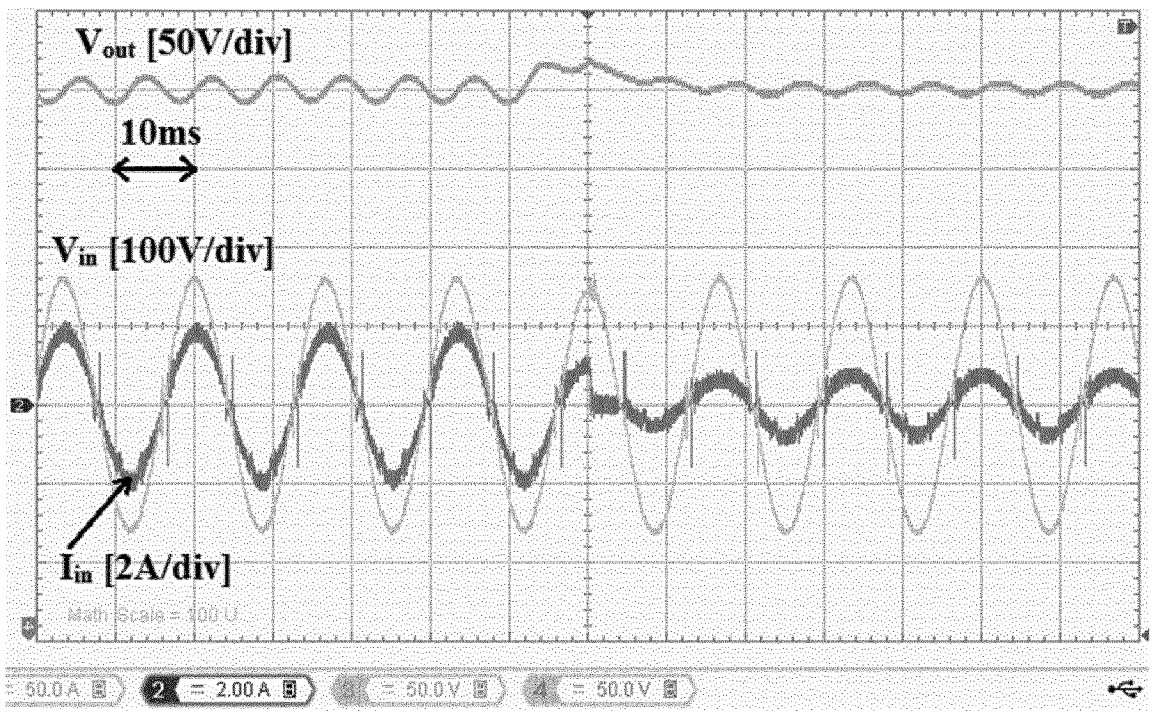

FIG. 15 illustrates the line input current and output voltage of the PFC stage in response to a severe periodic load varying between 60 W (30% nominal load) and 160 W (80% nominal load) every 500 ms.

Whilst not visible per se, the intra-cycle controller gets kicked in at the peak input voltage to suppress the power transfer to the PFC output as detailed in FIG. 15(b), which prevents any further overshoot and allow shorter settling time. Impressively, the controller manages to determine the correct value for $R_e$ well within two line cycles with no significant overshoot. It should also be appreciated that the 200 W boost rectifier employed only 68 μF of capacitance at the output, which represents approximately only one quarter what might be expected in a conventional design [10]. If the conventional amount of capacitance was employed, performance would be expected to be significantly improved.

It will be appreciated that bulk capacitances employed in power supplies typically provide more than one function. These include ripple reduction, transient protection and hold-up. Conventionally, hold-up has been the dominant condition that determines the required value of bulk capacitance for a power supply.

Equally, by providing an alternative hold-up circuit which employs other capacitors, the hold-up function and ripple reduction function may be separated. Indeed by providing a hold-up circuit that provides for deep discharge of the associated hold-up (bulk) capacitors, the size of the bulk capacitors can be reduced. In this context, it will be appreciated equally that hold-up capacitors need not be electrolytic capacitors which are generally selected for their cycling and low esr characteristics. Thus higher power density capacitors may be employed. Such an approach is described in a related application of the applicant (PCT Application No PCT/EP2015/055352), the entire contents of which are herein incorporated by reference.

In this context, the control scheme described herein when used in the context of ripple reduction allows for operation with a significantly reduced capacitance required to account for ripple.

Accordingly, using the control approaches described above addressing the former issue of ripple in combination with a following-stage topology allowing for such "deep discharge" for hold-up, the bulk capacitor value requirements may be reduced to be of the order of 250 nF/W as compared with more conventional arrangements where the order is more likely to be in the range of 500 nF to 1 uF per watt of rated output power.

Accordingly, it will be appreciated that the solutions presented herein allows for at least 50% reduction in the output capacitance while ensuring the output voltage well within allowable dynamic ranges even in the worst case of 80% to 20% step loads. The implementation is relatively simple with low hardware demand. While the power-balance-based concept is only explained above in the context of a synchronous rectifier PFC stage, it will be appreciated that it equally may be employed with other PFC topologies.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention. It will be understood that whilst particular polarity devices, e.g. PMOS, NMOS, PNP or NPN may be illustrated in the figures, that alternative polarity devices may be employed by appropriate modification of the circuits.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of controlling a current-shaping circuit in a power supply having an AC input or output, the method comprising:
    providing a value of emulated resistance;
    performing a current loop compensator function responsive to the value of emulated resistance to provide a control signal to the current shaping circuit;
    measuring, at a first point in a first half cycle of the AC input or output, a deviation of a voltage on a storage capacitor from a reference voltage;
    calculating at this first point an updated value of emulated resistance based on an amount of additional power required to correct for the deviation over a predefined time of at least one half cycle;
    employing the updated value of emulated resistance with the current loop compensator function for a second half cycle subsequent to the first half cycle; and
    during the second half cycle, measuring for a transient and upon detecting a transient, causing the employed updated value of emulated resistance to be corrected to a corrected employed updated value of emulated resistance.

2. The method of controlling a current-shaping circuit according to claim 1, wherein the first point where the measurement is made is proximate to a zero crossing of the AC input or output.

3. The method of controlling a current-shaping circuit according to claim 1, wherein the calculation for the updated value of emulated resistance is given by:

$$R_e^{-1}[t_n] = R_e^{-1}[t_{n-2}] + \frac{2C_{bulk}}{T_{line}V_m^2}(V_{ref}^2 + V_{out}^2[t_{n-2}] - 2V_{out}^2[t_n]),$$

where: $t_n$ is a point in the first half cycle of the AC input or output,
    $R_e^{-1}[t_n]$ is the calculated value of emulated resistance calculated at the first point $t_n$,
    $R_e^{-1}[t_{n-2}]$ is a calculated value of emulated resistance for a half cycle of the AC input or output previous to the first half cycle of the AC input or output,
    $C_{bulk}$ is a value of a storage capacitor in the power supply,
    $T_{line}$ is a cycle duration of the AC input or output,
    $V_m$ is a line voltage of the AC input or output,
    $V_{ref}$ is the reference voltage, and
    $V_{out}$ is the voltage on the storage capacitor.

4. The method of controlling a current-shaping circuit according to claim 1, wherein the measuring for the transient is performed at a second point which is distinct from the first point.

5. The method of controlling a current-shaping circuit according to claim 1, wherein the measuring for the transient is made proximate to a peak or trough of the AC input or output.

6. The method of controlling a current-shaping circuit according to claim 1, wherein the correction of the employed updated value of emulated resistance to the corrected employed updated value of emulated resistance is by calculating an additional power required to correct for the transient over the remaining part of the second half cycle of the AC input or output; and employing the corrected employed updated value of emulated resistance in the current loop compensator function for the remaining part of the second half cycle of the AC input or output.

7. The method of controlling a current-shaping circuit according to claim 1, wherein the correction of the employed updated value of emulated resistance is based on the equation:

$$R_e^{-1}[t_n] = R_e^{-1}[t_{n-2}] + \frac{4C_{bulk}}{T_{line}V_m^2}(V_{ref}^2 + V_{out}^2[t_{n-2}] - 2V_{out}^2[t_{n-1}])$$

where: $t_{n-1}$ is the point when the transient is measured,
    $R_e^{-1}[t_{n-2}]$ is a calculated value of emulated resistance for a half cycle of the AC input or output previous to the first half cycle of the AC input or output,
    $C_{bulk}$ is a value of a storage capacitor in the power supply,
    $T_{line}$ is a cycle duration of the AC input or output,
    $V_m$ is a line voltage of the AC input or output,
    $V_{ref}$ is the reference voltage, and
    $V_{out}$ is the voltage on the storage capacitor.

8. The method of controlling a current-shaping circuit according to claim 1, wherein the correction of the employed updated value of emulated resistance is only performed when a change in emulated resistance, $\Delta R_e^{-1}$, between the emulated resistance and the employed updated value of emulated resistance is above a predetermined threshold.

9. A method of controlling a current-shaping circuit in a power supply having an AC input or output, the method comprising:
    providing a value of emulated resistance;
    performing a current loop compensator function responsive to the value of emulated resistance to provide a control signal to the current shaping circuit;

measuring, at a first point in a first half cycle of the AC input or output, a deviation of a voltage on a storage capacitor from a reference voltage;

calculating at this first point an updated value of emulated resistance based on an amount of additional power required to correct for the deviation over a predefined time of at least one half cycle;

employing the updated value of emulated resistance with the current loop compensator function for a second half cycle subsequent to the first half cycle; and during the second half cycle, measuring for a transient and upon detecting a transient, causing the employed updated value of emulated resistance to be corrected to a corrected employed updated value of emulated resistance, wherein the correction of the employed updated value of emulated resistance is performed by calculating a correction value for the emulated resistance and adding the correction value to the employed updated value of emulated resistance to provide the corrected employed updated value of emulated resistance.

10. A method of controlling a current-shaping circuit having at least one switch operated at a switching frequency in a power supply, the power supply having an AC waveform on a supply or load side, the method comprising:

providing a control signal to the at least one switch using a first control function arranged to cause a current in the current-shaping circuit to be in phase with the AC waveform, during a first cycle or half cycle of the AC waveform, based on a value of emulated resistance determined for the cycle or half cycle;

performing a second control function to provide an updated value of emulated resistance to the first control function for a second cycle or half cycle, wherein the second control function provides the updated value of emulated resistance value at a first point, which is a zero crossing, peak or trough of the AC waveform based on an amount of additional power required to correct for the deviation over a predefined time of at least one half cycle; and detecting a transient during the second cycle or half cycle of the AC waveform, and in response to a detection of the transient, performing a third control function causing the updated value of emulated resistance to be corrected.

11. The method according to claim 10, wherein the updated value of emulated resistance is provided at a position of a zero crossing of the AC waveform.

12. The method according to claim 10, wherein the detecting of the transient occurs when the transient exceeds a threshold.

13. The method according to claim 10, wherein said update by the second control function is provided at a peak or trough of the AC waveform.

14. The method according to claim 10, wherein the updated value of emulated resistance provided by the second control function is calculated based on an additional power required to correct for a deviation between a voltage of a storage capacitor in the power supply and a reference voltage over a predefined time of at least one half cycle.

15. The method according to claim 14, wherein the updated value of emulated resistance provided by the second control function is given by:

$$R_e^{-1}[t_n] = R_e^{-1}[t_{n-2}] + \frac{2C_{bulk}}{T_{line}V_m^2}(V_{ref}^2 + V_{out}^2[t_{n-2}] - 2V_{out}^2[t_n]),$$

where $R_e^{-1}[t_n]$ is the value of emulated resistance updated at the first point $t_n$ with $R_e^{-1}[t_{n-2}]$ being a value of emulated resistance for a previous half cycle, $C_{bulk}$ being a capacitance value of a storage capacitor in the power supply, $T_{line}$ being the cycle duration of the AC waveform on the supply or load side and $V_{ref}$ is a reference voltage, $V_m$ is a line voltage of the AC input or output, and $V_{out}$ being a voltage of the storage capacitor.

16. The method according to claim 10, wherein the updated value of emulated resistance is provided at a peak of the AC waveform.

17. The method according to claim 10, wherein the updated value of emulated resistance is provided at a trough of the AC waveform.

* * * * *